US012775339B2

(12) United States Patent
Hu

(10) Patent No.: US 12,775,339 B2
(45) Date of Patent: Oct. 27, 2026

(54) LEVEL SETTING METHOD AND ELECTRONIC DEVICE

(71) Applicant: Honor Device Co., Ltd., Shenzhen (CN)

(72) Inventor: Zhongkai Hu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/329,894

(22) Filed: Sep. 16, 2025

(65) Prior Publication Data

US 2026/0003440 A1 Jan. 1, 2026

Related U.S. Application Data

(63) Continuation of application No. PCT/CN2024/081269, filed on Mar. 12, 2024.

(30) Foreign Application Priority Data

Jul. 3, 2023 (CN) ........................ 202310810477.5

(51) Int. Cl.
*G06F 3/023* (2006.01)

(52) U.S. Cl.
CPC .................................... *G06F 3/023* (2013.01)

(58) Field of Classification Search
CPC .................................. G06F 3/02; G06F 3/023
See application file for complete search history.

(56) References Cited

U.S. PATENT DOCUMENTS 5,539,400 A 7/1996 Mears
5,760,714 A * 6/1998 Zimmerman .......... H03M 11/20 341/26
7,450,031 B2 * 11/2008 Wang .................... G06F 3/0202 341/26
8,258,985 B2 * 9/2012 Huang .................. G06F 3/0202 341/26
8,760,321 B2 * 6/2014 Chiu ...................... H03M 11/20 341/26
2004/0075649 A1 4/2004 Peng et al.
(Continued)

FOREIGN PATENT DOCUMENTS

CN 1195132 A 10/1998
CN 101626247 B 11/2012
(Continued)

*Primary Examiner* — Patrick F Marinelli
(74) *Attorney, Agent, or Firm* — Conley Rose, P.C.

(57) ABSTRACT

Embodiments of this disclosure are applied to the field of circuit control, and provide a level setting method and an electronic device. When determining that a keyboard is in an off state, an electronic device configures level statuses of all output pins in the keyboard to a first level, to avoid existence of a potential difference between an input pin and an output pin. When the keyboard is in an on state, the electronic device configures levels of all the output pins corresponding to keys on the keyboard to a second level or a third level. When the levels of the output pins are the second level or the third level, the keyboard can generate an interrupt properly when receiving a user's operation of pressing a key, so that the electronic device can determine, based on the interrupt, the key pressed by the user.

17 Claims, 13 Drawing Sheets

(56) References Cited

U.S. PATENT DOCUMENTS

| | | | | |
|---|---|---|---|---|
| 2006/0077074 | A1* | 4/2006 | Wang | H01H 13/86 341/26 |
| 2012/0050964 | A1 | 3/2012 | Fisher, Jr. et al. | |
| 2026/0003440 | A1* | 1/2026 | Hu | G06F 3/023 |

FOREIGN PATENT DOCUMENTS

| | | | |
|---|---|---|---|
| CN | 101958717 | B | 4/2013 |
| CN | 103154855 | A | 6/2013 |
| CN | 107204765 | A | 9/2017 |
| CN | 109298331 | A | 2/2019 |
| CN | 110221709 | A | 9/2019 |
| CN | 111600591 | A | 8/2020 |

* cited by examiner

LEVEL SETTING METHOD AND ELECTRONIC DEVICE

CROSS-REFERENCE TO RELATED APPLICATIONS

This is a continuation of International Patent Application No. PCT/CN2024/081269, filed on Mar. 12, 2024, which claims priority to Chinese Patent Application No. 202310810477.5, filed on Jul. 3, 2023, both of which are incorporated herein by reference in their entireties.

TECHNICAL FIELD

This disclosure relates to the field of circuit control, and in particular, to a level setting method and an electronic device.

BACKGROUND

As technologies develop, an electronic device (for example, a tablet computer) is usually equipped with a corresponding keyboard. When a user enters information by using the keyboard, the user may press a key on the keyboard. In response to the operation of pressing the key, the keyboard generates an interrupt. The electronic device may scan keys based on the interrupt, to obtain a corresponding key scanning result, for example, determine the key pressed by the user, and then perform a corresponding processing operation, for example, display content corresponding to the key pressed by the user.

However, after the keyboard is used for a period of time, an abnormal oxide may be generated on a circuit of the keyboard. As a result, the electronic device obtains an erroneous key scanning result and cannot correctly perform corresponding processing, shortening a service life of the keyboard and reducing user experience.

SUMMARY

Embodiments of this disclosure provide a level setting method and an electronic device, to ensure accuracy of a key scanning result and extend a service life of a keyboard.

To achieve the foregoing objectives, the following technical solutions are used in embodiments of this disclosure.

According to a first aspect, a level setting method is provided. The method may be applied to an electronic device equipped with or connected to a keyboard. The electronic device may obtain a use status of the keyboard. The use status of the keyboard includes an off state and an on state. When the keyboard is in the off state, the electronic device may configure level statuses of all output pins in the keyboard to a first level; or when the keyboard is in the on state, the electronic device configures levels of all output pins corresponding to keys on the keyboard to a target level. The target level includes a second level or a third level, the target level is higher than the first level, the second level is less than the third level, and the second level and the third level are both used for the keyboard to generate an interrupt in response to an operation of triggering a key on the keyboard. Levels of all input pins corresponding to the keys on the keyboard are the first level.

In this disclosure, if the keyboard is in the off state, it indicates that the keyboard is not used by a user. Therefore, the electronic device may adjust the level statuses of all the output pins in the keyboard to a low level. In addition, it can be learned from the foregoing descriptions that all the input pins in the keyboard are set to the first level by default. Therefore, it can indicate that, if the keyboard is in the off state, there is no potential difference between an input pin and an output pin. In other words, according to the manner of determining the use status of the keyboard, duration of the potential difference between an input pin and an output pin can be reduced, retarding generation of an abnormal oxide, reducing a probability of keyboard aging, increasing a service life of the electronic device, and improving the user's use experience. If the keyboard is in the on state, it indicates that a user may use the keyboard. Therefore, the electronic device may set the levels of all the output pins corresponding to the keys on the keyboard to the second level or the third level. When the levels of the output pins are the second level, the potential difference between an input pin and an output pin is small. A smaller potential difference indicates a lower speed of generating an abnormal oxide. Therefore, the speed of generating an abnormal oxide can be reduced, ensuring accuracy of a keyboard scanning result and extending a service life of the keyboard.

In a possible implementation of the first aspect, the keyboard may be a matrix keyboard. The electronic device equipped with a keyboard means that the keyboard is part of the electronic device. Usually, the keyboard is not detached. The electronic device connected to a keyboard means that the keyboard is connected to the electronic device externally. The keyboard may be detached based on a user requirement. That the keyboard is connected to the electronic device externally may be that the keyboard is connected to the electronic device by a wired connection, or may be that the keyboard is connected to the electronic device by a wireless connection.

In this disclosure, the keyboard is a matrix keyboard, and the matrix keyboard is a keyboard set arranged in a matrix used in an external device of a microcontroller unit. Therefore, when the matrix keyboard is used, a plurality of keys on the keyboard can share one input pin, or a plurality of keys can share one output pin. In this way, occurrence of a waste of interface resources can be reduced, and interface usage can be increased.

In a possible implementation of the first aspect, in response to the user's operation of pushing the electronic device and/or the keyboard, the electronic device may obtain the use status of the keyboard.

In this implementation, when the user pushes the electronic device and/or the keyboard, an angle between a side on which a display in the electronic device is located and a front of the keyboard changes. Therefore, the electronic device can obtain the use status of the keyboard. In this way, occurrence of a waste of resources that is caused by obtaining the use status of the keyboard in real time can be reduced, and an unnecessary loss of power is reduced.

In a possible implementation of the first aspect, the on state of the keyboard includes an unfolded and idle state and a scanning state, the unfolded and idle state indicates a state corresponding to a case in which the keyboard is capable of being used as an input device, but receives no operation of triggering a key on the keyboard, and the scanning state indicates a state corresponding to a case in which the keyboard is used as an input device; and the process of configuring the target level may specifically include: When the keyboard is in the unfolded and idle state, the electronic device separately configures the levels of all the output pins to the second level; or when the keyboard is in the scanning state, the electronic device separately configures the levels of all the output pins to the third level.

In this disclosure, if the keyboard is in the unfolded and idle state, it indicates that the keyboard is in the on state, but no key on the keyboard is pressed, for example, the keyboard does not generate an interrupt and the electronic device does not scan the keyboard. Therefore, to retard generation of an abnormal oxide, the electronic device may configure the levels of all the output pins to the second level, to reduce a potential difference between an input pin and an output pin. In this way, generation of an abnormal oxide is retarded, the probability of keyboard aging is reduced, the service life of the electronic device is increased, and the user's use experience is improved. In addition, because there is a potential difference between an input pin and an output pin that correspond to a key, the keyboard can still generate an interrupt.

In a possible implementation of the first aspect, when the keyboard is in the unfolded and idle state, the electronic device configures the levels of all the output pins corresponding to the keys on the keyboard to the second level. Then, in response to the user's operation of triggering a key on the keyboard, the electronic device switches the use status of the keyboard from the unfolded and idle state to the scanning state, and configures the levels of all the output pins corresponding to the keys on the keyboard to the third level. Then, the electronic device scans the keys on the keyboard, to determine the key triggered by the user, for example, to determine a target key.

In this disclosure, if the keyboard is in the unfolded and idle state and a key on the keyboard is triggered, it indicates that the keyboard is currently being used by the user. Therefore, the electronic device may switch the use status of the keyboard from the unfolded and idle state to the scanning state, and configure the levels of all the output pins corresponding to the keys on the keyboard to the third level, to facilitate scanning the keys on the keyboard based on a generated interrupt signal. In this way, accuracy of determining the target key can be ensured while generation of an abnormal oxide is retarded, improving the user's use experience.

In a possible implementation of the first aspect, the operation of triggering a key on the keyboard may be an operation of pressing a key on the keyboard.

In a possible implementation of the first aspect, the process of determining the target key may include: The electronic device configures the levels of the output pins except a target output pin to the first level, where the target output pin is any one of all the output pins in the keyboard. Then, the electronic device obtains level information of all the input pins, where the level information includes the first level and the third level. Then, the electronic device determines, based on the level information of each input pin, whether there is the target key among the keys corresponding to the target output pin. When there is the target key among the keys corresponding to the target output pin, the electronic device determines a key that corresponds to an input pin with a level of the third level and the target output pin, as the target key.

In this disclosure, according to the manner of configuring a level of any one of all the output pins to the third level, an input pin with a level of the third level is determined, and the target key is determined based on the input pin with the level of the third level and the output pin with the level of the third level. In this way, accuracy of determining the target key can be improved.

In a possible implementation of the first aspect, the target output pin may be an output pin located in a first position in the keyboard, or may be an output pin located in a last position in the keyboard.

In this disclosure, the levels of the output pins may be configured in a regular pattern, to improve work efficiency of key scanning.

In a possible implementation of the first aspect, the process of obtaining the level information of all the input pins may specifically include: The electronic device may obtain the level information of all the input pins simultaneously; and after obtaining the level information, the electronic device determines, based on the level information of each input pin, whether any of the keys corresponding to the target output pin is pressed, for example, determines whether there is the target key among the keys corresponding to the target output pin.

In this disclosure, the level information of the input pins may be obtained simultaneously. In this way, efficiency of obtaining the level information can be improved, further improving efficiency of determining the target key.

In a possible implementation of the first aspect, the process of obtaining the level information of all the input pins may specifically include: The electronic device may obtain level information of a first input pin, where the first input pin is any one of all the input pins corresponding to the keys on the keyboard. Then, the electronic device may determine, based on the level information of the first input pin, whether a key corresponding to the first input pin and the target output pin is the target key. If the key corresponding to the first input pin and the target output pin is the target key, the electronic device may determine that there is the target key among the keys corresponding to the target output pin.

In this disclosure, if the key corresponding to the first input pin and the target output pin is the target key, the electronic device may determine the target key directly, with no need to perform a subsequent key scanning step. In this way, efficiency of determining the target key can be improved.

In a possible implementation of the first aspect, the foregoing further includes: If the key corresponding to the first input pin and the target output pin is not the target key, or the key corresponding to the first input pin and the target output pin is the target key, the electronic device may obtain level information of a second input pin. Then, the electronic device takes the second input pin as a first input pin, and returns to perform the step that "the electronic device may determine, based on the level information of the first input pin, whether a key corresponding to the first input pin and the target output pin is the target key", until the electronic device determines that there is the target key, or until the electronic device completes determination for the keys corresponding to the target output pin.

In this disclosure, regardless of whether the key corresponding to the first input pin and the target output pin is determined to be the target key or not, the level information of the input pins except the first input pin can be obtained. In this way, accuracy of determining the target key can be improved, and occurrence of a case in which a key is pressed but not scanned can be reduced.

In a possible implementation of the first aspect, the method further includes: When there is no target key among the keys corresponding to the target output pin, the electronic device configures a level of a first output pin to the third level, and configures the levels of the output pins except the first output pin to the first level, where the first output pin is any output pin that is of all the output pins corresponding to the keys on the keyboard and that is not determined as the target output pin. Then, the electronic device takes the first output pin as a target output pin, and returns to the step that "the electronic device determines, based on the level information of each input pin, whether there is the target key among the keys corresponding to the target output pin", until the electronic device obtains the target key.

In this disclosure, according to the manner of scanning the keys sequentially, accuracy of determining the target key can be improved, further improving the user's use experience.

In a possible implementation of the first aspect, after determining the target key, the electronic device determines whether a key on the keyboard is pressed. If none of the keys on the keyboard is pressed, the electronic device stops scanning, and configures the levels of all the output pins to the second level.

In this disclosure, after determining the target key, the electronic device may continue to determine whether a key on the keyboard is pressed, for example, whether the user presses a key on the keyboard again. If none of the keys on the keyboard is pressed, it indicates that the electronic device does not receive the user's operation of pressing any key on the keyboard. Therefore, the electronic device may stop scanning the keys on the keyboard, and configure the levels of all the output pins to the second level, to wait for the user's next pressing operation. In this way, the potential difference between an input pin and an output pin can be reduced, slowing generation of an abnormal oxide.

In a possible implementation of the first aspect, when the keyboard is in the scanning state, the method further includes: in response to the user's first operation performed on the electronic device and/or the keyboard (for example, a pushing operation, a folding operation, or a closing operation), determining the angle between the side on which the display in the electronic device is located and the front of the keyboard. Then, when the angle is a reflex angle, a complete angle, or a zero angle, the electronic device configures the levels of all the output pins to the first level, and switches the use status of the keyboard from the scanning state to the off state.

In this disclosure, if the angle between the side on which the display in the electronic device is located and the front of the keyboard is a reflex angle, a complete angle, or a zero angle, it indicates that the keyboard cannot be used by the user. Therefore, the electronic device may configure the levels of all the output pins to the first level, to reduce the duration of the potential difference between an input pin and an output pin. In this way, generation of an abnormal oxide is retarded, the probability of keyboard aging is reduced, the service life of the electronic device is increased, and the user's use experience is improved.

In a possible implementation of the first aspect, when the keyboard is in the unfolded and idle state, the method further includes: in response to the user's second operation performed on the electronic device and/or the keyboard (for example, a pushing operation, a folding operation, or a closing operation), determining the angle between the side on which the display in the electronic device is located and the front of the keyboard. Then, when the angle is a reflex angle, a complete angle, or a zero angle, the electronic device configures the levels of all the output pins to the first level, and switches the use status of the keyboard from the unfolded and idle state to the off state.

In this disclosure, if the angle between the side on which the display in the electronic device is located and the front of the keyboard is a reflex angle, a complete angle, or a zero angle, it indicates that the keyboard cannot be used by the user. Therefore, the electronic device may configure the levels of all the output pins to the first level, to reduce the duration of the potential difference between an input pin and an output pin. In this way, generation of an abnormal oxide is retarded, the probability of keyboard aging is reduced, the service life of the electronic device is increased, and the user's use experience is improved.

In a possible implementation of the first aspect, when the keyboard is in the off state, the method further includes: in response to a third operation performed on the electronic device and/or the keyboard, determining the angle between the side on which the display in the electronic device is located and the front of the keyboard. Then, when the angle is an inferior angle (for example, an obtuse angle, a right angle, an acute angle, or a straight angle), the electronic device may switch the status of the keyboard to the unfolded and idle state, and configure the levels of all the output pins to the second level.

In this disclosure, if the angle between the side on which the display in the electronic device is located and the front of the keyboard is an inferior angle, it indicates that the keyboard can be used by the user. Therefore, the electronic device may configure the levels of all the output pins to the second level, to wait for the user's operation of pressing a key on the keyboard. In this way, accuracy of determining the target key can be ensured while generation of an abnormal oxide is retarded, improving the user's use experience.

In a possible implementation of the first aspect, the first level is 0 V, and the second level is 1.8 V.

In this disclosure, because hardware in the electronic device considers, by default, that there are three voltage levels, namely, 0 V, 1.8 V, and 3.3 V, an interrupt can be generated when there is a potential difference between an input pin and an output pin that correspond to a key. Therefore, for a purpose of reducing a value of a potential difference while generating an interrupt, a voltage corresponding to the second level may be configured to 1.8 V.

In addition, it is considered that the speed of generating an abnormal oxide is also related to a magnitude of a potential difference. A larger potential difference indicates a higher speed of generating an abnormal oxide, while a smaller potential difference indicates a lower speed of generating an abnormal oxide. Therefore, compared with a potential difference of 3.3 V, the potential difference of 1.8 V can reduce the speed of generating an abnormal oxide, reducing the probability of keyboard aging, increasing the service life of the electronic device, and ensuring correctness of a keyboard scanning result. Further, the user's operation of pressing any key on the keyboard can be received correctly, improving the user's use experience.

In a possible implementation of the first aspect, the third level is 3.3 V.

In this disclosure, because the hardware in the electronic device considers, by default, that there are three voltage levels, namely, 0 V, 1.8 V, and 3.3 V, and the electronic device requires a sufficient voltage when scanning the keys on the keyboard, the electronic device may not be able to implement key scanning if a potential difference between an input pin and an output pin remains at 1.8 V. To ensure proper scanning, the electronic device may configure a voltage corresponding to the third level to 3.3 V.

According to a second aspect, an electronic device is provided. The electronic device includes a keyboard, a display, a memory, and one or more processors. The keyboard, the display, the memory, and the processor are coupled. The keyboard is configured to receive an operation of triggering a key on the keyboard. The display is configured to display an image generated by the processor. The memory is configured to store computer program code, and the computer program code includes computer instructions. When the processor executes the computer instructions, the electronic device is enabled to perform the level setting method according to any one of the items of the first aspect.

According to a third aspect, an electronic device is provided. The following is included: The electronic device is connected to a keyboard externally. The keyboard is configured to receive an operation of triggering a key on the keyboard. The electronic device includes a display, a memory, and one or more processors. The display, the memory, and the processor are coupled. The display is configured to display an image generated by the processor. The memory is configured to store computer program code, and the computer program code includes computer instructions. When the processor executes the computer instructions, the electronic device is enabled to perform the level setting method according to any one of the items of the first aspect.

According to a fourth aspect, a computer-readable storage medium is provided, including computer instructions. When the computer instructions are run on an electronic device, the electronic device is enabled to perform the user identification method according to any one of the items of the first aspect.

According to a fifth aspect, a computer program product is provided. When the computer program product is run on a computer, the computer is enabled to perform the user identification method according to any one of the items of the first aspect.

According to a sixth aspect, a chip is provided, including an input interface, an output interface, a processor, and a memory. The input interface, the output interface, the processor, and the memory are connected to each other by internal connection paths. The processor is configured to execute code in the memory. When the code is executed, the processor is configured to perform the method described above.

It may be understood that, for beneficial effects that can be achieved by the electronic devices according to the second aspect and the third aspect, the computer-readable storage medium according to the fourth aspect, the computer program product according to the fifth aspect, and the chip according to the sixth aspect provided above, reference may be made to the beneficial effects in any one of the first aspect or the possible designs of the first aspect. Details are not described herein.

DESCRIPTION OF EMBODIMENTS

Figure 1A:
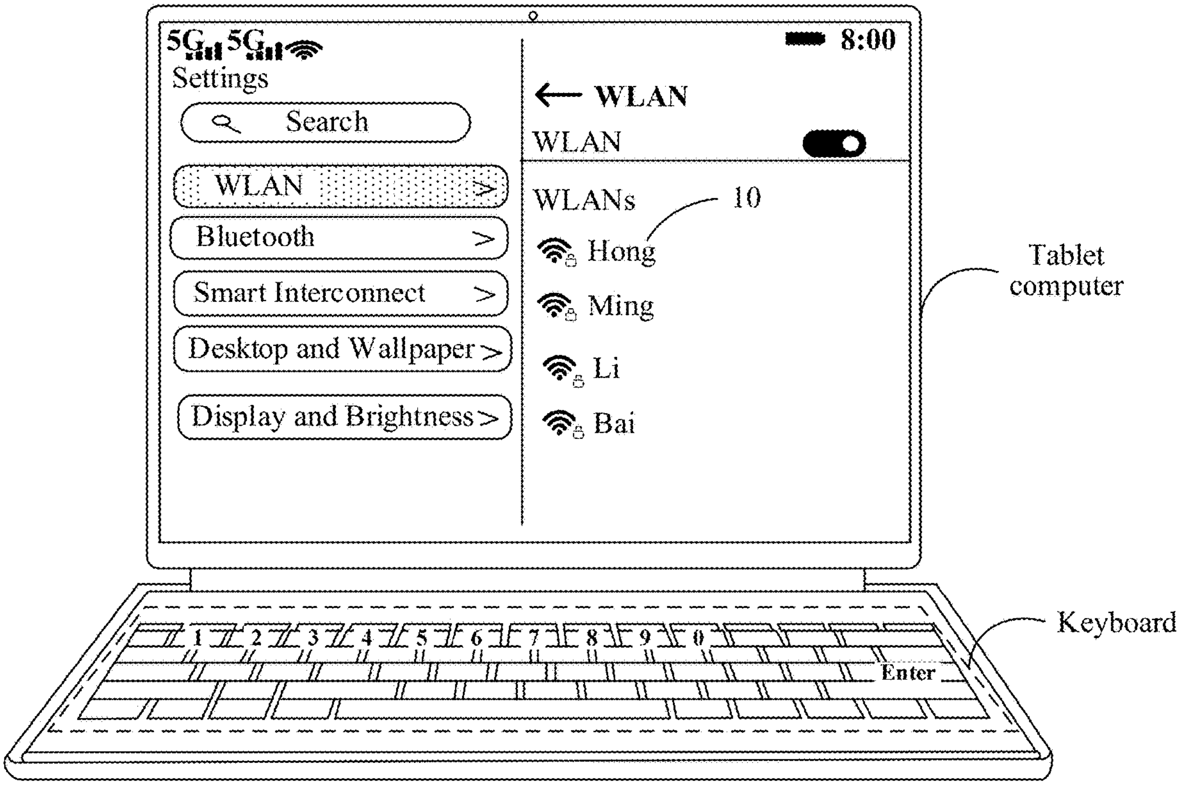
FIG. 1A is a diagram 1 of a Wi-Fi connection screen according to an embodiment of this disclosure.

The following describes the technical solutions in embodiments of this disclosure with reference to the accompanying drawings in embodiments of this disclosure. In descriptions of this disclosure, unless otherwise specified, "and/or" in this disclosure is merely an association describing associated objects, indicating that three relationships may exist. For example, A and/or B may indicate the following three cases: Only A exists, both A and B exist, and only B exists, where A and B may be singular or plural. In addition, in the descriptions of this disclosure, unless otherwise specified, "a plurality of" means two or more. "at least one of the following items (pieces)" or a similar expression thereof indicates any combination of these items, including a single item (piece) or any combination of a plurality of items (pieces). For example, at least one of a, b, or c may indicate a, b, c, a-b, a-c, b-c, or a-b-c, where a, b, and c may be singular or plural. In addition, to facilitate clear description of the technical solutions in embodiments of this disclosure, words such as "first" and "second" are used to distinguish between same or similar items with substantially same functions and roles in embodiments of this disclosure. A person skilled in the art may understand that the words such as "first" and "second" do not limit a quantity or an execution order, and the words such as "first" and "second" do not necessarily indicate a difference either. In addition, in embodiments of this disclosure, an expression such as "example" or "for example" is used to represent giving an example, an illustration, or a description. Any embodiment or design solution described by using an "example" or "for example" in embodiments of this disclosure should not be explained as being more preferred or having more advantages than another embodiment or design solution. To be precise, use of the expression such as "example" or "for example" is intended to present a related concept in a specific manner, to facilitate understanding.

In some embodiments, an electronic device (for example, a notebook computer or a tablet computer) is usually equipped with a corresponding keyboard. By pressing a key on the keyboard, a user may trigger the electronic device to perform a corresponding operation. For example, when a user wants a tablet computer to connect to a Wi-Fi network named "Hong", the user may trigger a control 10 "Hong" shown in FIG. 1A. In response to the operation of triggering the control 10, the tablet computer may display an Enter password screen corresponding to the Wi-Fi network named "Hong". The Enter password screen includes a password entry control. Then, the user may enter a password in the password entry control. For example, the user may press a key "1", a key "2", and a key "3" on a keyboard sequentially, to enter a password. Then, based on the keys pressed (the key "1", the key "2", and the key "3"), the tablet computer may display corresponding content (for example, "123" shown in FIG. 1B) in the password entry control on the Enter password screen.

Figure 1B:
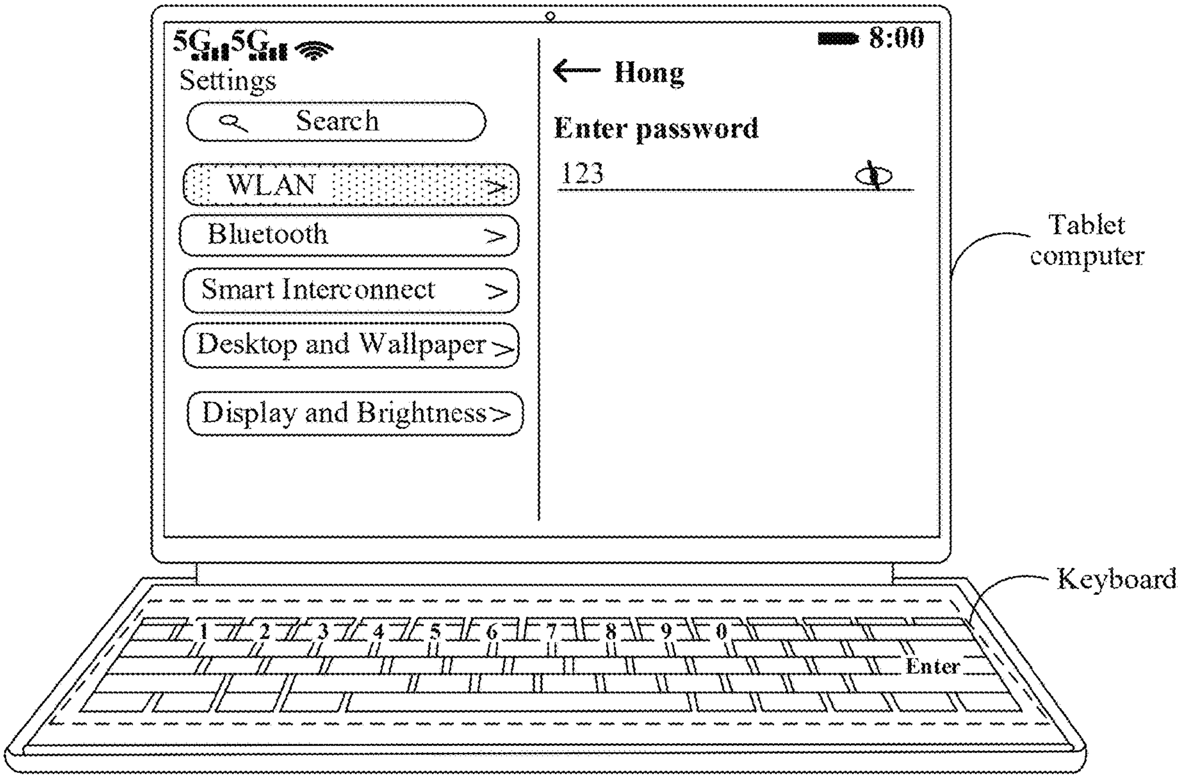
FIG. 1B is a diagram 2 of a Wi-Fi connection screen according to an embodiment of this disclosure.

It should be noted that the key "1", the key "2", and the key "3" may be input-type keys on the keyboard, and the keyboard may also have functional keys, for example, functional keys shown in FIG. 1A or FIG. 1B.

It may be understood that, before using the keyboard, the user needs to connect the tablet computer to the keyboard. For example, the tablet computer may be connected to the keyboard in a manner such as Bluetooth or a data cable. After the connection is completed, the user may trigger, by pressing a key on the keyboard, the tablet computer to perform a corresponding operation.

In some embodiments, it can be learned from the keyboard shown in FIG. 1A or FIG. 1B that there are a plurality of keys on the keyboard. If input pins and output pins of all the keys are connected to general-purpose input/output (GPIO) ports in a microcontroller unit (MCU), it results in an excessive waste of interface resources. Therefore, in this implementation, a manner is used, in which a plurality of keys share one input pin or a plurality of keys share one output pin, reducing occurrence of a waste of interface resources.

Figure 2:
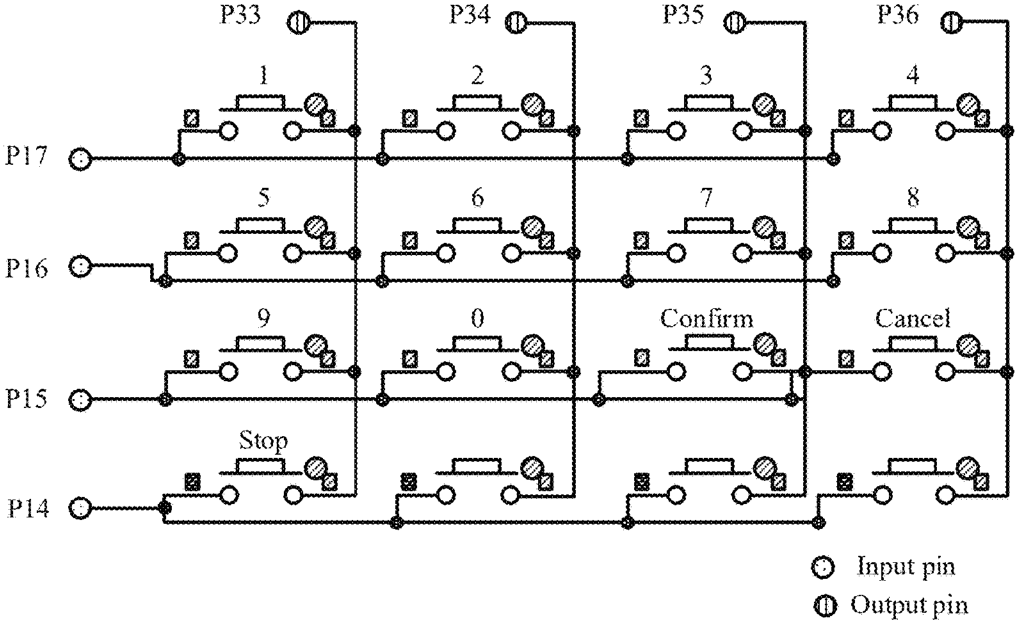
FIG. 2 is a diagram of hardware principles of a matrix keyboard according to an embodiment of this disclosure.

For example, keys in a same column may correspond to one output pin, and keys in a same row may correspond to one input pin. For example, a 4×4 matrix keyboard in FIG. 2 is used as an example. The 4×4 matrix keyboard includes 16 keys. In other words, each row in the 4×4 matrix keyboard includes four keys, and likewise, each column includes four keys. The matrix keyboard is a keyboard set arranged in a matrix used in an external device of a microcontroller unit.

In this implementation of this disclosure, four horizontal pins are used as a set of input pins (keyboard scan in), for example, P17, P16, P15, and P14 are used as input pins. Levels of the input pins are low levels by default. Four vertical pins are used as a set of output pins (keyboard scan out), for example, P33, P34, P35, and P36 are used as output pins. Levels of the output pins are high levels by default. In other words, keys in a column correspond to one output pin (or described as that keys in a column are connected in parallel to/share one output pin). For example, a key "1", a key "5", a key "9", and a key "Stop" share the output pin P33. Keys in a row correspond to one input pin (or described as that keys in a row are connected in parallel to/share one input pin). For example, the key "1", a key "2", a key "3", and a key "4" share the input pin P17.

It may be understood that the input pins and output pins are separately connected to GPIO ports in a MCU, for example, the input pins and output pins may be controlled by eight GPIO pins that extend from the MCU. An electronic device may configure the input pins to work in interrupt input mode. The interrupt input mode means that the GPIO pins connected to the input pins are set to work in interrupt input mode, to implement an interrupt function. Specifically, when a key on the keyboard is pressed, a rising edge corresponding to the key is triggered. To be specific, a level of an input pin corresponding to the key is pulled up, so that an input signal corresponding to a GPIO pin connected to the input pin changes, and an interrupt is generated (or described as that an interrupt signal is generated). Then, the MCU executes a corresponding interrupt procedure, for example, starts to scan the keys, to determine the key pressed by a user, for example, the key triggered by the user.

Correspondingly, the electronic device may configure the output pins to work in push-pull output mode. The push-pull output mode means that the GPIO pins connected to the output pins are set to work in push-pull output mode, to implement a push-pull output control manner. Specifically, when a key on the keyboard is pressed, the MCU may pull up or down an output signal of an output pin corresponding to the key. For example, the electronic device may configure voltages of the output pins to a high level (for example, 3.3 V), and the output pins output the high level by default.

It should be noted that the foregoing manner in which each input pin corresponds to one GPIO pin and each output pin corresponds to one GPIO pin (for example, the input pins and output pins may be controlled by the eight GPIO pins that extend from the MCU) is merely an example. Alternatively, a plurality of input pins or output pins may be connected to one GPIO pin. In this disclosure, a connection relationship between the input and output pins and the GPIO pins in the microcontroller unit is not limited.

In some embodiments, in response to a user's operation of pressing a key on a keyboard, an electronic device triggers an interrupt. Then, the electronic device may scan keys on the keyboard sequentially, to determine a target key, for example, the key pressed.

Figure 3:
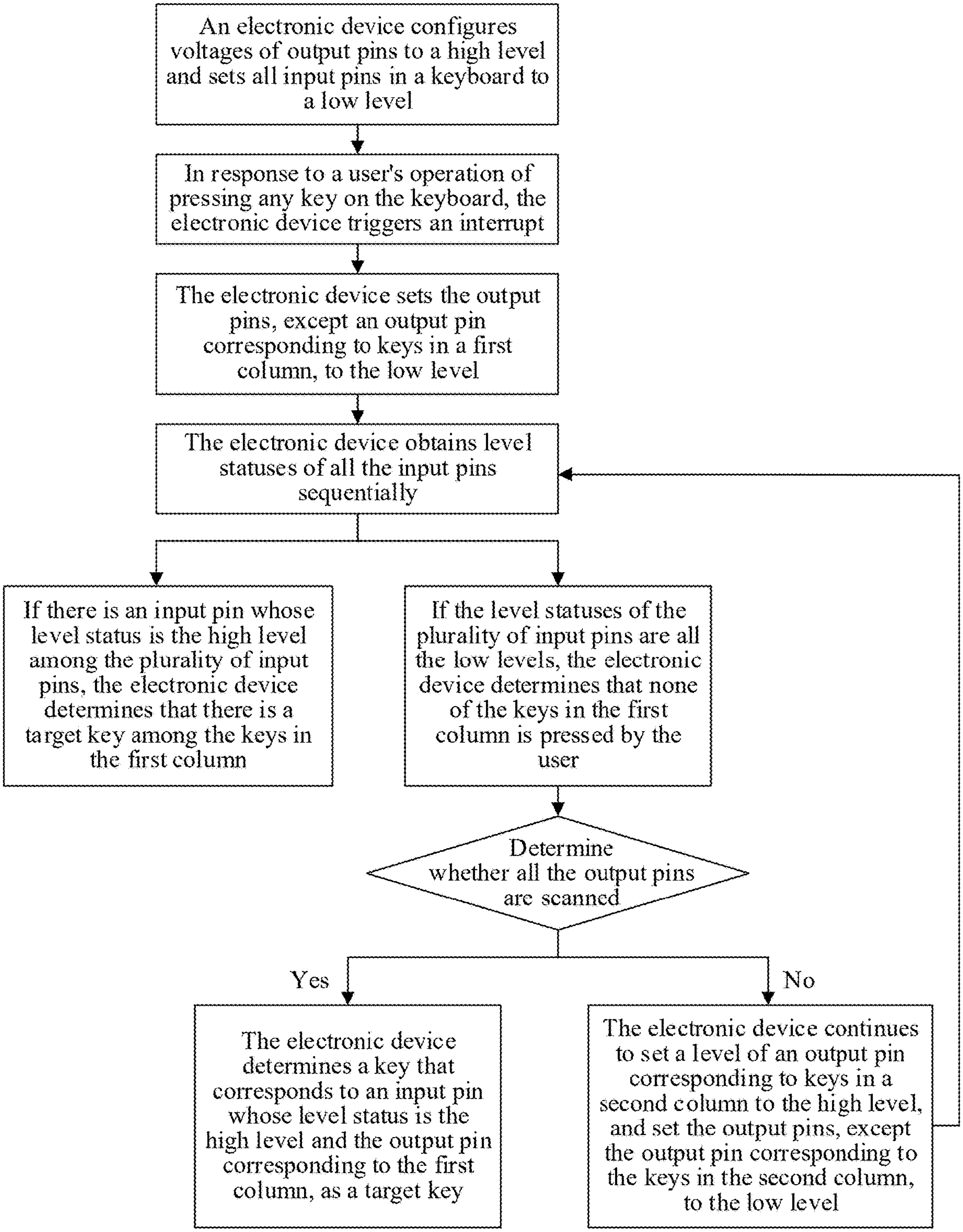
FIG. 3 is a flowchart of a method for determining a target key according to an embodiment of this disclosure.

Specifically, as shown in FIG. 3, a process of scanning the keys on the keyboard by the electronic device may specifically include: The electronic device may set output pins, except an output pin corresponding to keys in a first column, to a low level. Then, the electronic device may obtain level statuses (or referred to as levels for short) of all input pins sequentially. If there is an input pin whose level status is a high level among the plurality of input pins, the electronic device may determine that there is the target key among the keys in the first column, for example, determine a key that corresponds to the input pin whose level status is the high level and the output pin corresponding to the first column, as the target key. If the level statuses of the plurality of input pins are all the low levels, the electronic device may determine that none of the keys in the first column is pressed by the user. Therefore, the electronic device may continue to set a level of an output pin corresponding to keys in a second column to the high level, and set the output pins, except the output pin corresponding to the keys in the second column, to the low level. Then, the electronic device may return to the step that "the electronic device may obtain level statuses of all input pins sequentially", until the electronic device scans all the output pins. In this way, the target key is determined, and row-wise and column-wise scanning is implemented.

For example, the 4×4 matrix keyboard in FIG. 2 is used as an example. A user presses a key on the keyboard, and the keyboard generates an interrupt. First, in response to the interrupt, the electronic device may separately set levels of P34, P35, and P36 to a low level (for example, 0 V) after setting a level of the output pin P33 to a high level. If a level of the input pin P17 is a high level, the electronic device may determine the key "1" that corresponds to the output pin P33 and the input pin P17, as the key pressed, for example, a target key. If the input pin P17 is at a low level, the electronic device may continue to sequentially scan input pins corresponding to keys in other rows in a column in which the output pin P33 is located (for example, P16, P15, and P14), to determine whether the keys in the other rows (the key "5", the key "9", and the key "Stop") are triggered. If the input pin P16 is at a high level, the electronic device may determine the key "5" that corresponds to the output pin P33 and the input pin P16, as the target key.

If the input pins P16, P15, and P14 are all at a low level, it indicates that none of the key "1" that corresponds to the output pin P33 and the input pin P17, the key "5" that corresponds to the output pin P33 and the input pin P16, the key "9" that corresponds to the output pin P33 and the input pin P15, and the key "Stop" that corresponds to the output pin P33 and the input pin P14 is pressed by the user, for example, none of keys in a first column is pressed. In this case, the electronic device may continue to scan keys in a second column. Therefore, the electronic device may continue to set a level of the output pin P34 to the high level, and separately set levels of the output pins P33, P35, and P36 to the low level. Then, the electronic device may determine, based on levels of the input pins P17, P16, P15, and P14, whether a key in the second column is pressed. For example, if the input pin P16 is at a high level, the electronic device may determine that a key "6" corresponding to the output pin P34 and the input pin P16 is pressed, and determine the key "6" as the target key.

It should be noted that, before a key on the keyboard is pressed, the electronic device may configure voltages of the output pins to a high level (for example, 3.3 V) so that all the output pins in the keyboard output the high level, and set all the input pins in the keyboard to a low level.

Figure 4:
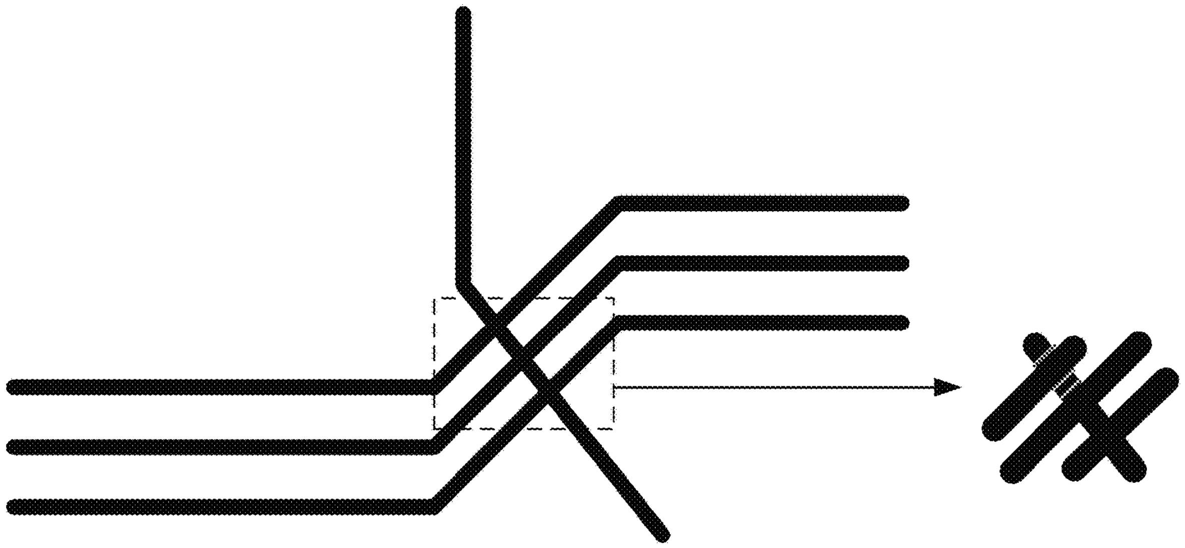
FIG. 4 is a physical diagram showing presence of foreign matter attached at an intersection in a matrix keyboard according to an embodiment of this disclosure.

It may be understood that there are usually intersections shown in FIG. 4 between wires of input pins and output pins that correspond to keys on a keyboard, and there is usually a potential difference at the intersections. By determining a change in the potential difference, an electronic device can determine a key pressed by a user on the keyboard.

However, due to factors such as an environment and duration of operation, presence of the potential difference promotes generation of an abnormal oxide at the intersections between the input pins and the output pins that correspond to the keys on the keyboard. If the electronic device (for example, the keyboard corresponding to the electronic device) operates for a long time in a high-temperature and high-humidity environment, gray adherents on edges of black lines in FIG. 4 form at the intersections between the input pins and the output pins that correspond to the keys on the keyboard. As a result, impedance changes, and further an input pin and an output pin with an abnormal oxide are conducted unexpectedly. Finally, accuracy of a key scanning result is affected, and a case may occur, in which a key is not pressed by the user but is mistakenly considered as being pressed. In addition, a service life of the keyboard and the user's use experience are both reduced.

Therefore, to resolve the foregoing problem, considering that generation of an abnormal oxide is related to a potential difference, to retard generation of an abnormal oxide, increase a service life of a keyboard, and ensure accuracy of a key scanning result, an embodiment of this disclosure provides a level setting method. In the method, an electronic device obtains a use status of a keyboard. The use status of the keyboard includes an off state and an on state. When the keyboard is in the off state, the keyboard is in a locked state, indicating that the keyboard is currently not being used as an input device, for example, a user does not use the keyboard. Therefore, the electronic device may separately adjust levels of all output pins corresponding to keys on the keyboard to a first level (for example, 0 V). When the keyboard is in the on state, it indicates that the keyboard can currently be used as an input device, and a user may use the keyboard. Therefore, to ensure that the keyboard can be used properly by the user, the electronic device may separately adjust levels of all output pins corresponding to keys on the keyboard to a target level. The target level includes a second level or a third level. The third level is greater than the second level. The target level is greater than the first level. When the levels of the output pins are the target level, the keyboard can generate an interrupt properly when receiving the user's operation of pressing a key, so that the electronic device can perform related processing based on the interrupt, ensuring the user's use experience. Regardless of a use state in which the keyboard is, levels of all input pins corresponding to the keys on the keyboard are all the first level.

In this implementation, if the keyboard is in the off state, the levels of the input pins and the output pins are all the first level, and there is no potential difference between an input pin and an output pin. In other words, according to the manner of determining the use status of the keyboard, duration of a potential difference between an input pin and an output pin can be reduced, retarding generation of an abnormal oxide, ensuring accuracy of a keyboard scanning result, reducing a probability of keyboard aging, increasing a service life of the keyboard, and improving the user's use experience. When the keyboard is in the on state, the electronic device may set the levels of the output pins to the second level or the third level based on a requirement. When the levels of the output pins are the second level, the potential difference between an input pin and an output pin is small. A smaller potential difference indicates a lower speed of generating an abnormal oxide. Therefore, the speed of generating an abnormal oxide can be reduced, ensuring accuracy of a keyboard scanning result and extending the service life of the keyboard.

For example, an electronic device in embodiments of this disclosure may be a device that is equipped with or can be connected to a keyboard, such as a tablet computer, a notebook computer, a portable computer, a personal computer (PC), or a vehicle-mounted computer. A specific form of the electronic device is not specially limited in the following embodiments.

Figure 5:
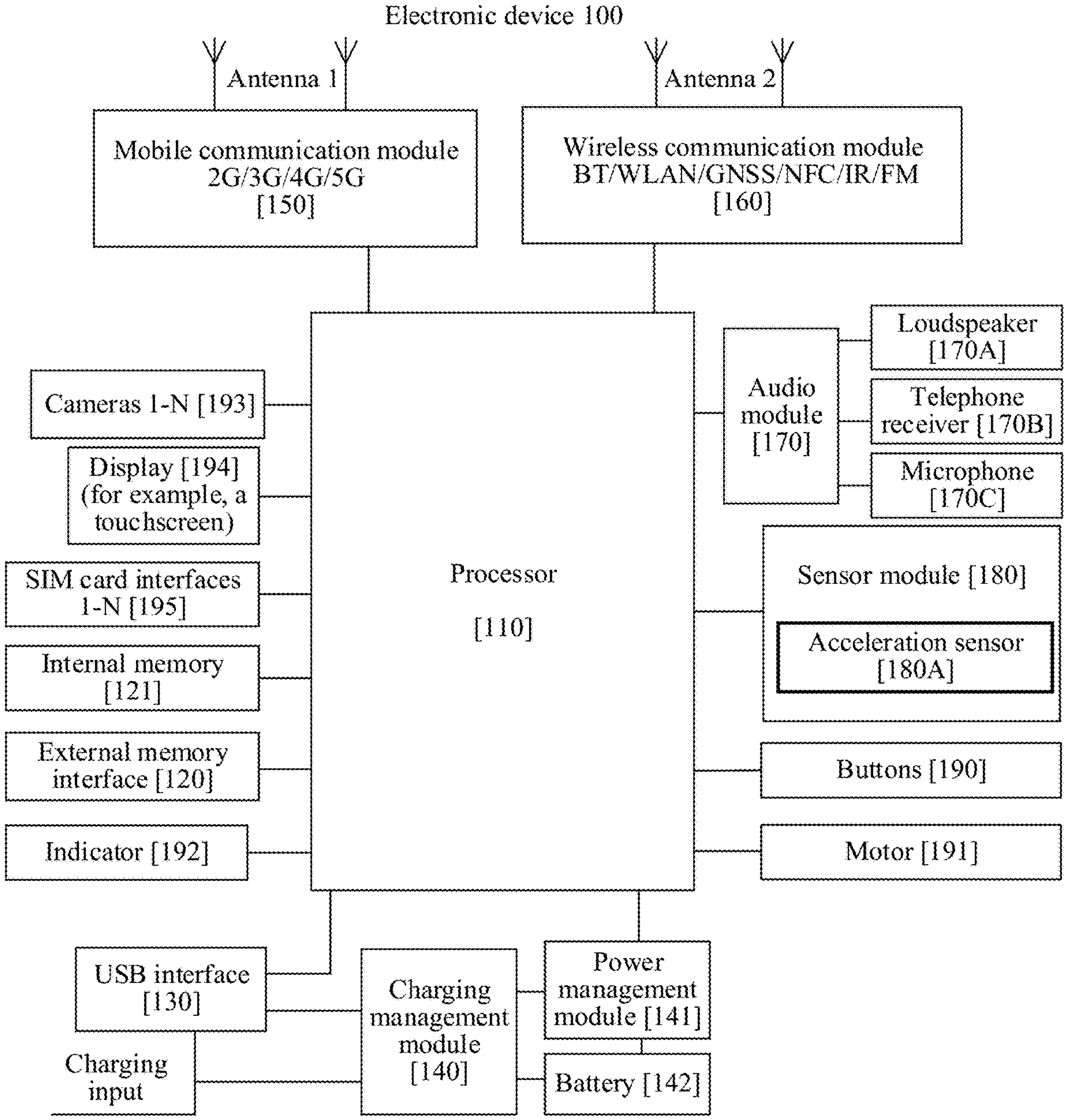
FIG. 5 is a diagram of a hardware structure of an electronic device according to an embodiment of this disclosure.

An example is used, in which the electronic device is a tablet computer. FIG. 5 is a diagram of a structure of an electronic device 100.

The electronic device 100 may include a processor 110, an antenna 1, an antenna 2, a mobile communication module 150, a wireless communication module 160, an audio module 170, a loudspeaker 170A, a telephone receiver 170B, a microphone 170C, a sensor module 180, an external memory interface 120, an internal memory 121, a universal serial bus (USB) interface 130, a charging management module 140, a power management module 141, a battery 142, buttons 190, a motor 191, an indicator 192, cameras 1-N 193, a display 194, subscriber identification module (SIM) card interfaces 1-N 195, and the like. The sensor module 180 may include an acceleration sensor 180A, a pressure sensor, a gyroscope sensor, a barometric pressure sensor, a magnetic sensor, a distance sensor, an optical proximity sensor, a fingerprint sensor, a temperature sensor, a touch sensor, an ambient light sensor, a bone conduction sensor, and the like.

It may be understood that the structure illustrated in this embodiment of the present disclosure does not constitute a specific limitation on the electronic device 100. In some other embodiments of this disclosure, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate components, or may be integrated into one or more processors.

The controller may be a nerve center and a command center of the electronic device 100. The controller may generate an operation control signal based on an instruction operation code and a timing signal, to complete control of instruction fetching and execution.

A memory may be further disposed in the processor 110, and is configured to store instructions and data. In some embodiments, the memory in the processor 110 is a cache. The cache may store instructions or data recently used or cyclically used by the processor 110. If the processor 110 needs to use the instructions or the data again, the processor 110 may invoke the instructions or the data directly from the cache. This avoids repeated access and reduces a waiting time of the processor 110, improving efficiency of a system.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a GPIO interface, and the like.

The I2S interface may be configured for audio communication. In some embodiments, the processor 110 may include a plurality of sets of I2S buses. The processor 110 may be coupled to the audio module 170 via the I2S bus, to implement communication between the processor 110 and the audio module 170. In some embodiments, the audio module 170 may transfer an audio signal to the wireless communication module 160 through the I2S interface, to implement a function of answering a call with a Bluetooth headset.

The PCM interface may also be configured for audio communication, and samples, quantizes, and encodes an analog signal. In some embodiments, the audio module 170 may be coupled to the wireless communication module 160 through the PCM bus interface. In some embodiments, the audio module 170 may also transfer an audio signal to the wireless communication module 160 through the PCM interface, to implement the function of answering a call with a Bluetooth headset. The I2S interface and the PCM interface may both be configured for audio communication.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device 100 may be configured to cover one or more communication frequency bands. Different antennas may be further multiplexed, to improve antenna utilization. For example, the antenna 1 may be multiplexed as a diversity antenna for a wireless local area network. In some other embodiments, the antennas may be used in combination with a tuning switch.

The mobile communication module 150 may provide wireless communication solutions that include 2G, 3G, 4G, 5G, or the like and that are applied to the electronic device 100. The mobile communication module 150 may include at least one filter, switch, power amplifier, low noise amplifier (LNA), and the like. The mobile communication module 150 may receive an electromagnetic wave by using the antenna 1, perform processing such as filtering and amplification on the received electromagnetic wave, and transmit the electromagnetic wave to the modem processor for demodulation. The mobile communication module 150 may further amplify a signal that is obtained after the modem processor performs modulation, and convert the signal into an electromagnetic wave by using the antenna 1, for radiation. In some embodiments, at least some of functional modules of the mobile communication module 150 may be disposed in the processor 110. In some embodiments, the at least some of the functional modules of the mobile communication module 150 may be disposed in a same device as at least some of modules of the processor 110.

The modem processor may include a modulator and a demodulator. The modulator is configured to modulate a to-be-transmitted low-frequency baseband signal into a medium- or high-frequency signal. The demodulator is configured to demodulate a received electromagnetic wave signal into a low-frequency baseband signal. Then, the demodulator transmits, to the baseband processor for processing, the low-frequency baseband signal obtained through demodulation. The low-frequency baseband signal is processed by the baseband processor and then transferred to the application processor. The application processor outputs a sound signal by using an audio device (which is not limited to the loudspeaker 170A, the telephone receiver 170B, or the like), or displays an image or a video by using the display 194. In some embodiments, the modem processor may be a separate component. In some other embodiments, the modem processor may be independent of the processor 110, and may be disposed in a same device as the mobile communication module 150 or another functional module.

The wireless communication module 160 may provide wireless communication solutions applied to the electronic device 100, including a wireless local area network (WLAN) (for example, a wireless fidelity (Wi-Fi) network), BLUETOOTH (BT), a global navigation satellite system (GNSS), frequency modulation (FM), near field communication (NFC), an infrared technology (IR), and the like. The wireless communication module 160 may be one or more devices into which at least one communication processing module is integrated. The wireless communication module 160 receives an electromagnetic wave by using the antenna 2, performs frequency modulation and filtering on the electromagnetic wave signal, and sends a processed signal to the processor 110. The wireless communication module 160 may further receive a to-be-sent signal from the processor 110, perform frequency modulation and amplification on the to-be-sent signal, and convert the to-be-sent signal into an electromagnetic wave by using the antenna 2, for radiation. In some embodiments, at least some of functional modules of the wireless communication module 160 may be disposed in the processor 110.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, IR technology, and/or the like. The GNSS may include a global positioning system (GPS), a global navigation satellite system (GLONASS), a Beidou navigation satellite system (BDS), a quasi-zenith satellite system (QZSS), and/or satellite based augmentation systems (SBAS).

It may be understood that inter-module interface connection relationships illustrated in this embodiment of the present disclosure are merely an example for description, and do not constitute a limitation on the structure of the electronic device 100. In some other embodiments of this disclosure, the electronic device 100 may alternatively use interface connection manners different from those in the foregoing embodiments, or use combinations of a plurality of interface connection manners.

The charging management module 140 is configured to receive a charging input from a charger. While charging the battery 142, the charging management module 140 may supply power to the electronic device 100 by using the power management module 141.

The electronic device 100 implements a display function by using the GPU, the display 194, the application processor, and the like. The GPU is an image processing microprocessor, and is connected to the display 194 and the application processor. The GPU is configured to perform mathematical and geometric calculations and is configured for graphics rendering. The processor 110 may include one or more GPUs, which execute program instructions to generate or change display information.

The display 194 is configured to display an image, a video, and the like. In some embodiments, the electronic device 100 may include one or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. The camera 193 is configured to capture a still image or a video. In some embodiments, the electronic device 100 may include one or N cameras 193, where N is a positive integer greater than 1.

The digital signal processor is configured to process a digital signal. In addition to a digital image signal, the digital signal processor may process other digital signals. For example, when the electronic device 100 selects a frequency, the digital signal processor is configured to find a Fourier transform for frequency energy, and the like.

The electronic device 100 may implement an audio function, for example, music playback or recording, by using the audio module 170, the loudspeaker 170A, the telephone receiver 170B, the microphone 170C, a headset jack, the application processor, and the like.

The audio module 170 is configured to convert digital audio information into an analog audio signal for output, and is also configured to convert an analog audio input into a digital audio signal. The audio module 170 may be further configured to encode and decode audio signals. In some embodiments, the audio module 170 may be disposed in the processor 110, or some of functional modules of the audio module 170 are disposed in the processor 110.

The loudspeaker 170A, also referred to as a "horn", is configured to convert an electrical audio signal into a sound signal. A user of the electronic device 100 may listen to music or answer a call in a hands-free mode by using the loudspeaker.

The telephone receiver 170B, also referred to as an "earpiece", is configured to convert an electrical audio signal into a sound signal. When a user of the electronic device 100 answers a call or listens to voice information, the user may listen to voice by bringing the telephone receiver 170B close to an ear of the user.

The microphone 170C, also referred to as a "mike" or a "mic", is configured to convert a sound signal into an electrical signal. When making a call or sending voice information, a user may talk into the microphone 170C, to input a sound signal into the microphone 170C. The electronic device 100 may be provided with at least one microphone 170C. In some other embodiments, the electronic device 100 may be provided with two microphones 170C, which can implement a denoising function in addition to collecting a sound signal. In some other embodiments, the electronic device 100 may be alternatively provided with three, four, or more microphones 170C, which can identify a sound source, implement a directional recording function, and the like in addition to collecting a sound signal and denoising.

The headset jack is configured to connect to a wired headset. The headset jack may be the USB interface 130, or may be a 3.5 mm open mobile terminal platform (OMTP) standard interface, or a cellular telecommunications industry association of the USA (CTIA) standard interface.

The acceleration sensor 180A may detect magnitudes of accelerations of the electronic device 100 in various directions (usually three axes). When the electronic device 100 is still, a magnitude and a direction of gravity may be detected. The acceleration sensor 180A may be further configured to recognize a posture of the electronic device, and is applied to an application such as switching between a landscape orientation and a portrait orientation or a pedometer.

In this implementation, the acceleration sensor 180A may be configured to detect an angle between a side on which the display is located and a front of a keyboard (for example, a side with keys), to determine a use status of the keyboard. It may be understood that, if the angle between the side on which the display is located and the front of the keyboard is between 90 degrees and 180 degrees, it can be determined that the keyboard is in an on state; or if the angle between the side on which the display is located and the front of the keyboard is zero degrees, or is greater than 180 degrees but less than or equal to 360 degrees, it can be determined that the keyboard is in an off state.

The gyroscope sensor may be configured to determine a motion posture of the electronic device 100. In some embodiments, angular velocities of the electronic device 100 around three axes (for example, an X-axis, a Y-axis, and a Z-axis) may be determined by using the gyroscope sensor.

The touch sensor is also referred to as a "touch panel". The touch sensor may be disposed on the display 194. The touch sensor and the display 194 form a touchscreen, which is also referred to as a "touch control screen". The touch sensor is configured to detect a touch operation performed on or near the touch sensor. The touch sensor may transfer a detected touch operation to the application processor, to determine a touch event type. Visual output related to the touch operation may be provided by the display 194. In some other embodiments, the touch sensor may be alternatively disposed on a surface of the electronic device 100, and is located at a position different from that of the display 194.

A magnetometer may be configured to measure intensity and a direction of a magnetic field and position the electronic device. With principles similar to those of a compass, the magnetometer can measure an angle between the current electronic device and each of the east, south, west, and north.

Data obtained by a linear acceleration sensor is data obtained by an acceleration sensor minus an acceleration caused by gravity.

A gravity acceleration sensor can sense a change in an accelerative force. The accelerative force is a force that acts on the electronic device during acceleration of the electronic device.

A rotation vector in a rotation vector sensor represents a direction of the electronic device, and is data obtained through calculation based on both coordinate axes and angles.

The external memory interface 120 may be configured to connect to an external storage card, for example, a micro SD card, to expand a storage capability of the electronic device 100.

The internal memory 121 may be configured to store computer-executable program code, and the executable program code includes instructions. By running the instructions stored in the internal memory 121, the processor 110 executes various functional applications and data processing of the electronic device 100. The internal memory 121 may include a program storage area and a data storage area. The program storage area may store an operating system, an application program required by at least one function (for example, a sound playback function or an image display function), and the like. The data storage area may store data created during use of the electronic device 100 (for example, audio data or a phone book), and the like. In addition, the internal memory 121 may include a high-speed random access memory, and may further include a nonvolatile memory, for example, at least one magnetic disk storage device, flash memory, or universal flash storage (UFS).

The buttons 190 include a power button, a volume button, and the like. The button 190 may be a mechanical button, or may be a touch-sensitive button. The electronic device 100 may receive a key input, and generate a key signal input related to a user setting and function control of the electronic device 100.

The motor 191 may generate a vibration alert. The motor 191 may be used for an incoming call vibration alert, or may be used for touch vibration feedback. The indicator 192 may be an indicator light.

The SIM card interface 195 is configured to connect to a SIM card.

An embodiment of this disclosure provides a level setting method. The method may be applied to an electronic device equipped with or connected to a keyboard. The keyboard includes a plurality of keys. The keyboard may be the matrix keyboard described above, or may be another type of keyboard. The electronic device equipped with a keyboard means that the keyboard is part of the electronic device. Usually, the keyboard is not detached. For example, the electronic device equipped with a keyboard may be a notebook computer. The electronic device connected to a keyboard means that the keyboard is connected to the electronic device externally. The keyboard may be detached based on a user requirement. For example, the electronic device connected to a keyboard may be a tablet computer. For example, that the keyboard is connected to the electronic device externally may be that the keyboard is connected to the electronic device by a wired connection (for example, a data cable), or may be that the keyboard is connected to the electronic device by a wireless connection (for example, BT). This is not specifically limited.

Figure 6:
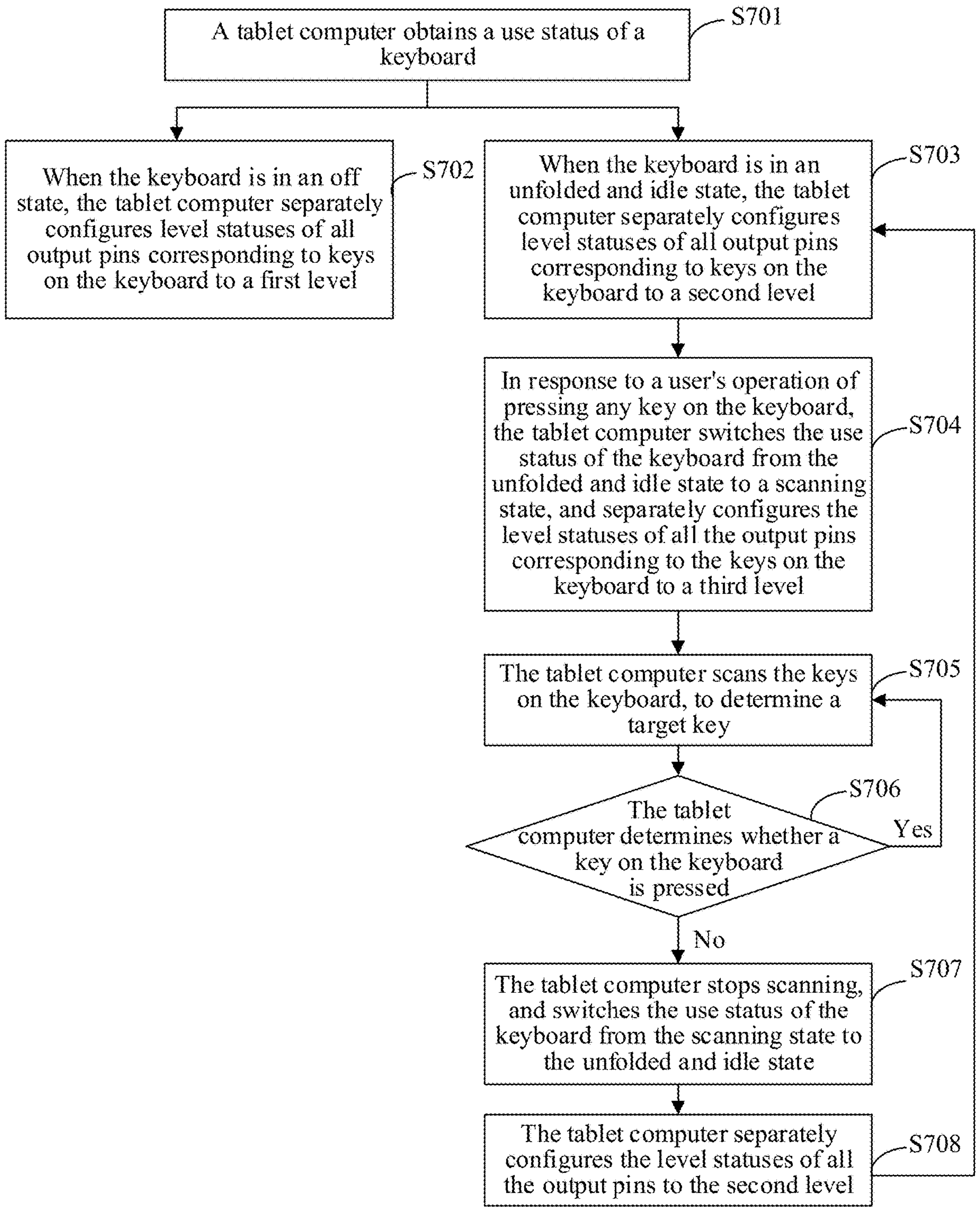
FIG. 6 is a flowchart of a level setting method according to an embodiment of this disclosure.

The following uses an example in which the electronic device is a tablet computer and the keyboard connected to the electronic device is a matrix keyboard. As shown in FIG. 6, the level setting method may include S701 to S708.

S701: A tablet computer obtains a use status of a keyboard.

The use status of the keyboard may include an off state and an on state.

In some embodiments, the off state of the keyboard indicates a state corresponding to a case in which the keyboard is not used as an input device, for example, a case in which the keyboard cannot be used, or a case in which the keyboard is locked.

Figure 7:
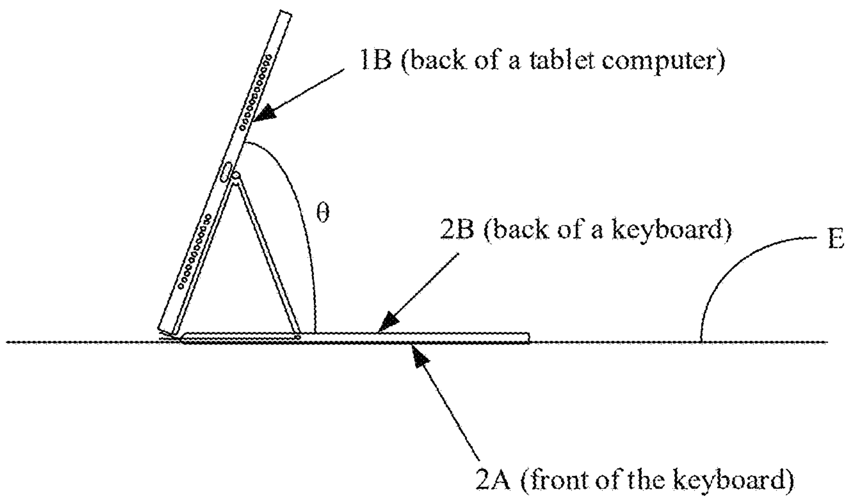
FIG. 7 is a diagram of a scene in which a keyboard is in a locked and supporting state according to an embodiment of this disclosure.

In an example, the off state of the keyboard indicates a locked and supporting state. The locked and supporting state may be a state corresponding to a case in which a front of the keyboard (for example, a side with keys) serves as a support for a display. As shown in FIG. 7, a front 2A of a keyboard is in contact with a worktop E, for example, an angle θ between a back 2B of the keyboard (for example, a side without keys) and a back 1B of a display (or referred to as a back of a tablet computer) is an acute angle or a right angle. In other words, the locked and supporting state indicates that keycaps of the keyboard serve as a support and the keyboard is locked in this case. The worktop is a flat surface on which the tablet computer is placed. The worktop may be a surface on which the keyboard is placed, such as a desktop, a countertop, or a user's lap. This is not specifically limited.

Figure 8:
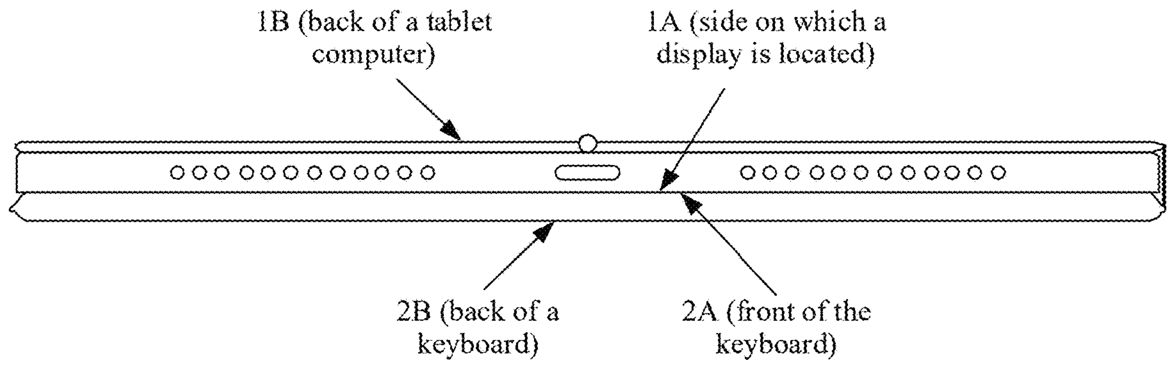
FIG. 8 is a diagram of a scene in which a keyboard is in a closed state according to an embodiment of this disclosure.

In another example, the off state of the keyboard indicates a closed state. The closed state may be a state corresponding to a case in which a front of the keyboard is in contact with a side on which a display is located. As shown in FIG. 8, an angle between a front 2A of a keyboard (a side facing away from a back 2B of the keyboard) and a side 1A on which a display is located (a side facing away from a back 1B of the display) is zero. In other words, the closed state indicates that keycaps of the keyboard face the display and the keyboard is locked in this case.

Figure 9:
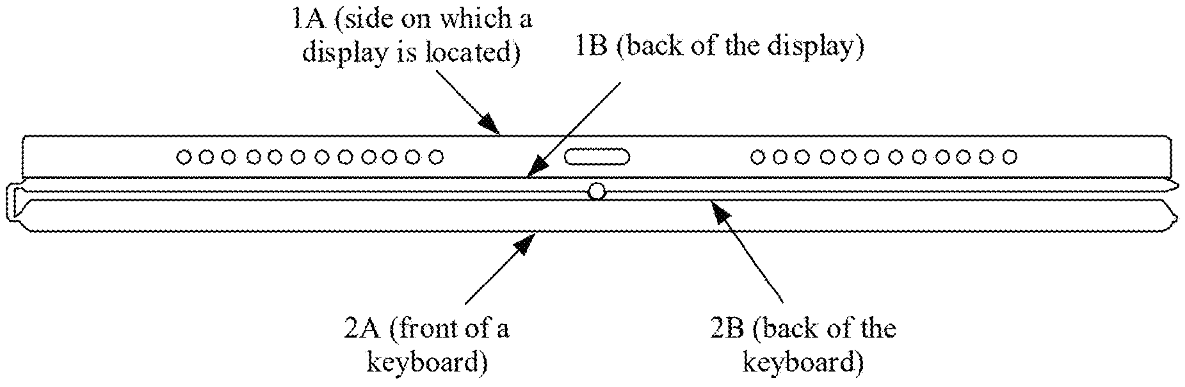
FIG. 9 is a diagram of a scene in which a keyboard is in a folded state according to an embodiment of this disclosure.

In another example, the off state of the keyboard indicates a folded state. The folded state may be a state corresponding to a case in which a back of the keyboard (a side facing away from a front 2A of the keyboard) is in contact with a back of a display (a side facing away from a side 1A on which the display is located), for example, a case in which the front of the keyboard faces away from the side on which the display is located. As shown in FIG. 9, an angle between a back 2B of a keyboard and a back 1B of a display is zero. In other words, the folded state indicates that keycaps of the keyboard face away from the display, the front of the keyboard serves as a support for the display, and the keyboard is locked in this case.

Figure 10:
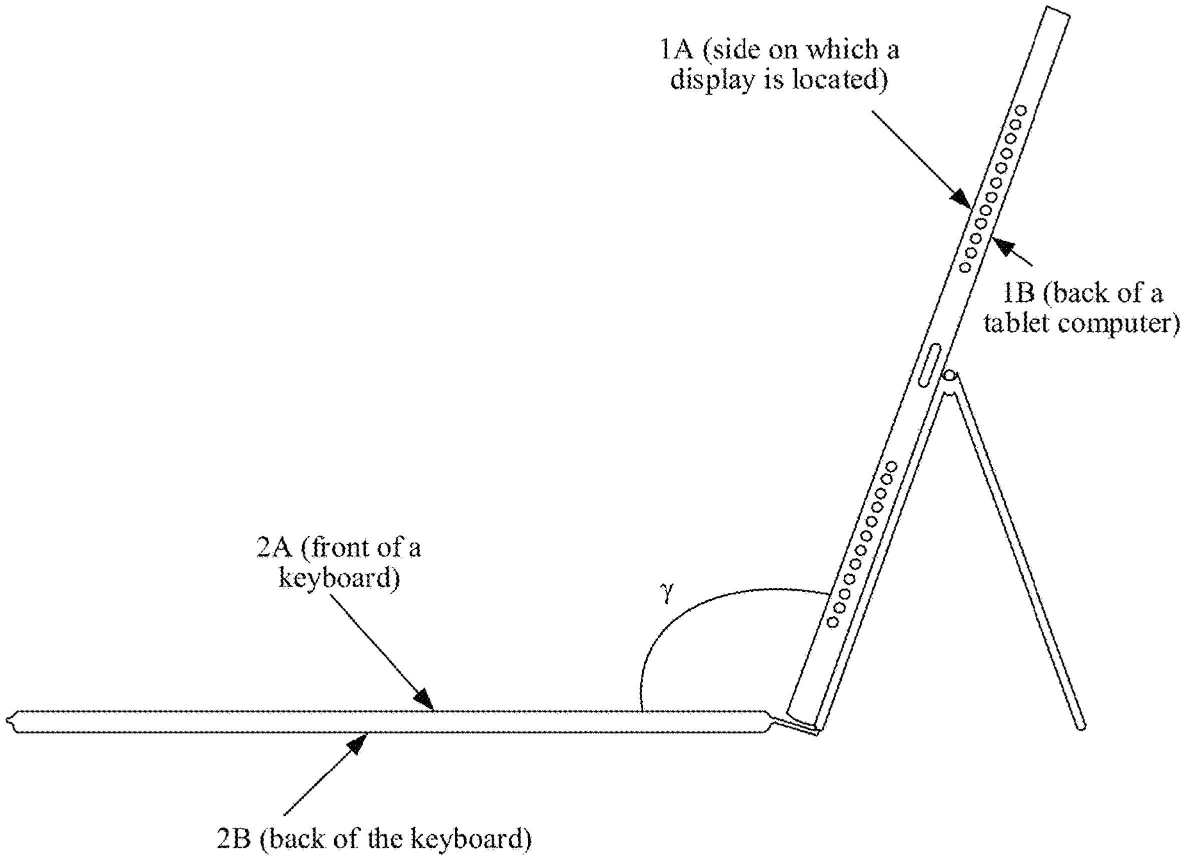
FIG. 10 is a diagram of a scene in which a keyboard is in an unfolded and supporting state according to an embodiment of this disclosure.

In some other embodiments, the on state of the keyboard indicates a state corresponding to a case in which the keyboard can be used, for example, a case in which the keyboard is activated. In an example, the on state of the keyboard indicates an unfolded and supporting state. The unfolded and supporting state may be a state corresponding to a case in which a back of the keyboard serves as a support for a display. As shown in FIG. 10, a back 2B of a keyboard is in contact with a worktop, for example, an angle γ between a front 2A of the keyboard and a side 1A on which a display is located is an obtuse angle, a right angle, or an acute angle. In the unfolded and supporting state, the tablet computer is used in combination with the keyboard, and the keyboard is activated.

Figure 11:
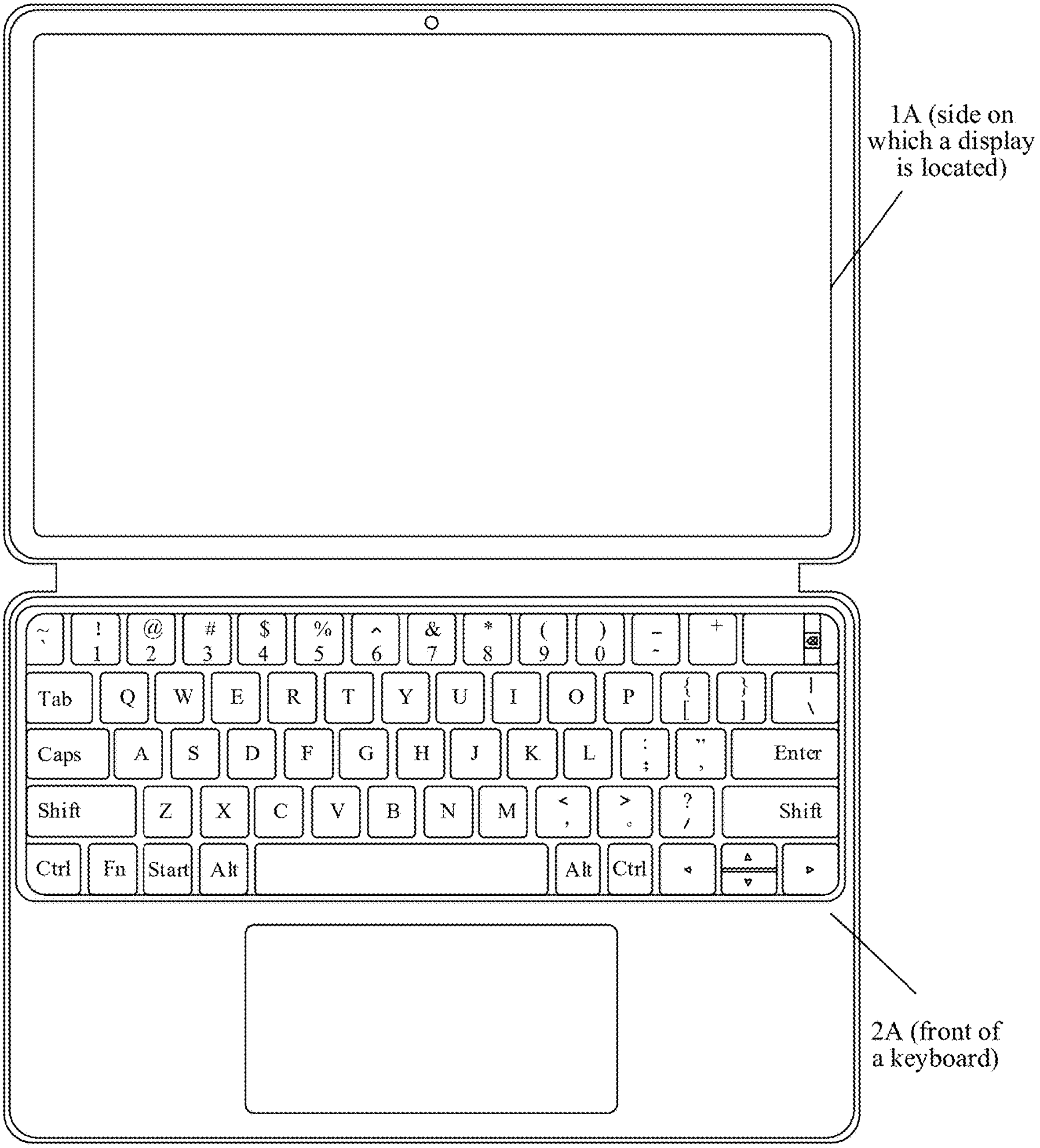
FIG. 11 is a diagram of a scene in which a keyboard is in an unfolded state according to an embodiment of this disclosure.

In another example, the on state of the keyboard indicates an unfolded state. The unfolded state may be a state corresponding to a case in which the keyboard and a display are on a same plane. As shown in FIG. 11, a back of a keyboard is in contact with a worktop and/or a back of a display is in contact with the worktop, and an angle between a front 2A of the keyboard and a side 1A on which the display is located is a straight angle. In the unfolded state, the tablet computer and the keyboard are located on a same horizontal plane, and the keyboard is activated.

The on state of the keyboard may include an unfolded and idle state and a scanning state. The unfolded and idle state indicates a state corresponding to a case in which the keyboard is capable of being used as an input device, but receives no operation of triggering a key on the keyboard, for example, a case in which the keyboard is in the on state, but no key on the keyboard is pressed. It may be understood that the unfolded and idle state may be the unfolded and supporting state, or may be the unfolded state. The scanning state indicates a state corresponding to a case in which the keyboard is used as an input device, for example, a case in which the keyboard receives a user pressing a key on the keyboard, or a case in which an electronic device needs to scan the keyboard. For example, in response to a user's operation of pressing any key on the keyboard, the tablet computer scans keys on the keyboard, so that the tablet computer can receive content corresponding to the pressed key. Therefore, the tablet computer can switch the use status of the keyboard from the unfolded and idle state to the scanning state. For example, if a key "Enter" on the keyboard shown in FIG. 1A or FIG. 1B is pressed, it indicates that the keyboard is currently being used by a user. Therefore, a use status of the keyboard may be switched from an unfolded and idle state to a scanning state. For another example, after the tablet computer determines that the keyboard is in the scanning state, if the tablet computer does not receive a user's operation of pressing any key on the keyboard (for example, the tablet computer does not receive a user's operation of pressing a key within a preset time), it indicates that the user is not using the keyboard currently, but might continue to use the keyboard. Therefore, to ensure that the keyboard can generate an interrupt properly, for example, to enable the keyboard to be used properly by the user, the tablet computer may switch the use status of the keyboard from the scanning state to the unfolded and idle state.

In some embodiments, after a user performs a related operation on the keyboard or the electronic device, and the operation causes a change in an angle between the keyboard and the tablet computer and further a change in the use status of the keyboard, the tablet computer may obtain a latest use status of the keyboard. In other words, the tablet computer does not need to obtain the use status of the keyboard in real time. In this way, occurrence of a waste of resources that is caused by obtaining the use status of the keyboard in real time can be reduced, and an unnecessary loss of power is reduced. Alternatively, the tablet computer may obtain the use status of the keyboard periodically.

S702: When the keyboard is in the off state, the tablet computer separately configures level statuses of all output pins corresponding to the keys on the keyboard to a first level.

Specifically, if the keyboard is in the off state, it indicates that the keyboard is locked, for example, a possibility that a user uses the keyboard is quite low. Therefore, the tablet computer does not need to perform the following: scanning the keys on the keyboard that is in the off state, to determine a target key pressed by the user. The tablet computer may adjust the level statuses of all the output pins corresponding to the keys on the keyboard to the first level. The first level may be a low level. For example, a voltage value corresponding to the low level may be 0 V.

The following may be understood: It can be learned from the foregoing descriptions that all input pins corresponding to the keys on the keyboard are set to the low level by default. If all the output pins corresponding to the keys on the keyboard are also set to the low level, the levels of the input pins and the levels of the output pins are the same, and there is no potential difference at an intersection between an input pin and an output pin. Therefore, according to the manner of adjusting the level statuses of all the output pins in the keyboard, duration during which there is a potential difference between an input pin and an output pin can be reduced, retarding generation of an abnormal oxide, reducing a probability of keyboard aging, increasing a service life of the electronic device, and improving the user's use experience. In addition, a probability that a key scanning result is erroneous due to an abnormal oxide can be reduced.

S703: When the keyboard is in the unfolded and idle state, the tablet computer separately configures level statuses of all output pins corresponding to the keys on the keyboard to a second level.

In this embodiment of this disclosure, after determining that the keyboard is not in the off state, for example, the keys are in the on state, the tablet computer may determine whether the keyboard is in the unfolded and idle state. If the keyboard is in the unfolded and idle state, to be able to trigger an interrupt, the tablet computer may configure levels of all the output pins corresponding to the keys on the keyboard to the second level. The second level is higher than the first level. For example, because hardware (for example, an MCU) in the tablet computer considers, by default, that there are three voltage levels, namely, 0 V, 1.8 V, and 3.3 V, an interrupt can be generated when there is a potential difference between an input pin and an output pin that correspond to a key. Therefore, for a purpose of reducing a value of a potential difference while generating an interrupt, a voltage corresponding to the second level may be configured to 1.8 V.

The following may be understood: It can be learned from the foregoing descriptions that all input pins corresponding to the keys on the keyboard are set to the low level by default, for example, voltage values of all the input pins corresponding to the keys on the keyboard are 0 V. If voltages of all the output pins corresponding to the keys on the keyboard are all configured to 1.8 V, it can be determined that the levels of the input pins and the levels of the output pins are different, and a potential difference at an intersection between an input pin and an output pin is 1.8 V. It is considered that a speed of generating an abnormal oxide is also related to a magnitude of a potential difference. A larger potential difference indicates a higher speed of generating an abnormal oxide, while a smaller potential difference indicates a lower speed of generating an abnormal oxide. Therefore, compared with a potential difference of 3.3 V, the potential difference of 1.8 V can reduce the speed of generating an abnormal oxide, reducing a probability of keyboard aging, increasing a service life of the electronic device, and ensuring correctness of a keyboard scanning result. Further, a user's operation of pressing any key on the keyboard can be received correctly, improving the user's use experience. In addition, after the user presses a key, the keyboard can generate a corresponding interrupt, ensuring that the key pressed by the user can be detected.

Figure 12:
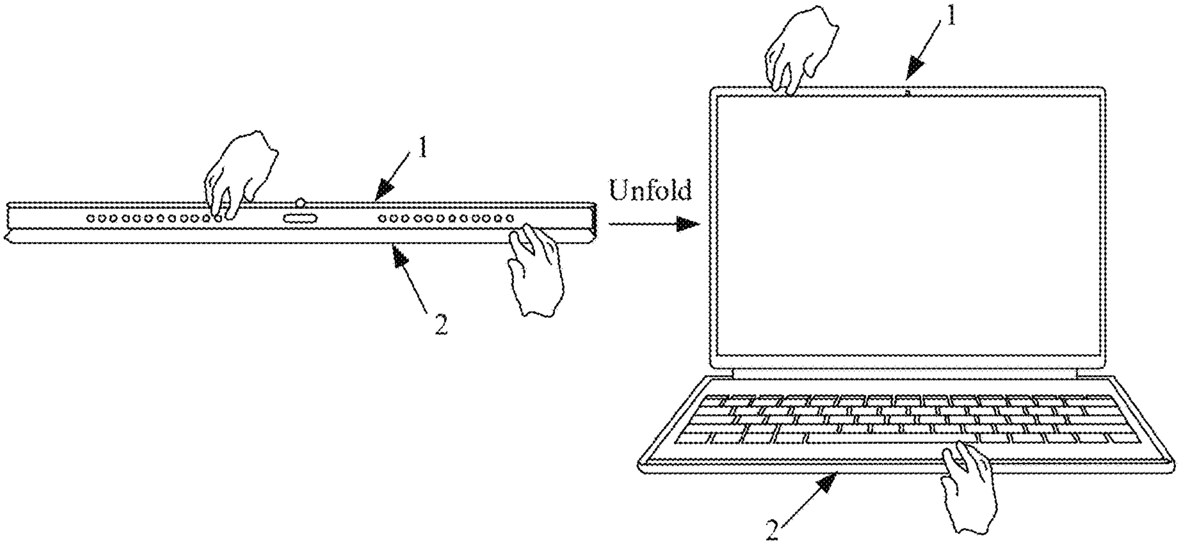
FIG. 12 is a diagram of a scene in which a keyboard is switched from an off state to an unfolded and idle state according to an embodiment of this disclosure.

In some embodiments, the use status of the keyboard may be switched from the off state to the unfolded and idle state. For example, as shown in FIG. 12, in response to a user's operation of pushing a keyboard 2 that is in an off state and/or a tablet computer 1, for example, the user unfolding the tablet computer 1 and the keyboard 2 that are in contact with each other, the tablet computer detects that an angle between a front of the tablet computer (for example, a side on which a display is located) and a front of the keyboard meets an angle corresponding to an unfolded and idle state (for example, the angle is a right angle). In this case, the tablet computer may switch a use status of the keyboard from the scanning state to the unfolded and idle state, to facilitate the user's subsequent operation of pressing a key.

Figure 13:
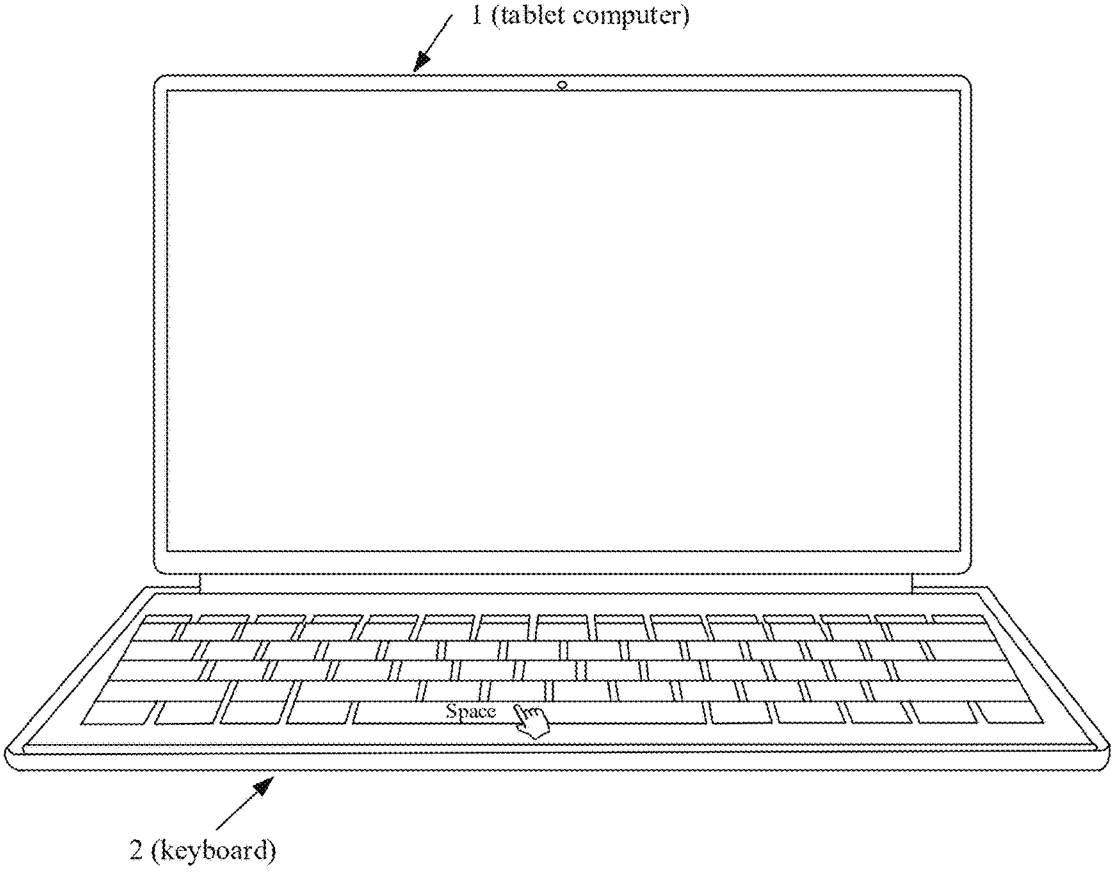
FIG. 13 is a diagram of a scene in which a keyboard is switched from a scanning state to an unfolded and idle state according to an embodiment of this disclosure.

In some other embodiments, the use status of the keyboard may be switched from the scanning state to the unfolded and idle state. For example, as shown in FIG. 13, after any key on a keyboard 2 (for example, a key "Space") is pressed, if a tablet computer does not receive a user's operation of pressing any key on the keyboard within a preset time, it indicates that after pressing the key "Space", the user does not press any key, for example, the user does not use the keyboard. Therefore, the tablet computer may switch a use status of the keyboard from a scanning state to an unfolded and idle state, to reduce a speed of generating an abnormal oxide. In addition, because there is still a possibility in this case that the keyboard is to be used by the user, switching to the unfolded and idle state allows the keyboard to still be able to generate an interrupt (or described as an interrupt signal) in response to the user's pressing operation.

In a possible implementation, the scanning state and the idle state are merely examples of the on state. After determining that the keyboard is not in the off state, for example, the keys are in the on state, the tablet computer may directly configure the levels of all the output pins corresponding to the keys on the keyboard to the second level or a third level, with no need to determine whether the keyboard is in the unfolded and idle state or the scanning state.

S704: In response to the user's operation of pressing any key on the keyboard, the tablet computer switches the use status of the keyboard from the unfolded and idle state to the scanning state, and separately configures the level statuses of all the output pins corresponding to the keys on the keyboard to the third level.

In an embodiment, if a key on the keyboard is pressed and the keyboard generates a corresponding interrupt signal, it indicates that a key on the keyboard is currently being used by a user. Therefore, after receiving the interrupt signal, the tablet computer may switch the use status of the keyboard from the unfolded and idle state to the scanning state.

It may be understood that, after determining that a key on the keyboard is pressed, the tablet computer needs to stop a task that is being performed before the key is pressed, to perform a task of scanning the keys on the keyboard. In other words, after any key on the keyboard is pressed, the tablet computer may perform the key scanning task in response to an interrupt signal about the keyboard.

Specifically, when the keyboard is in the scanning state, it indicates that the keyboard is being used by a user, for example, the user performs an operation of pressing a key on the keyboard. To be able to determine the key pressed by the user, the tablet computer may configure the level statuses of all the output pins corresponding to the keys on the keyboard to the third level. The third level is higher than the second level. For example, because the hardware in the tablet computer considers, by default, that there are three voltage levels, namely, 0 V, 1.8 V, and 3.3 V, and the tablet computer requires a sufficient voltage when scanning the keys on the keyboard, the tablet computer may not be able to implement key scanning if a potential difference between an input pin and an output pin remains at 1.8 V. To ensure proper scanning, the tablet computer may configure the third level to 3.3 V.

In some embodiments, when the on state does not include the unfolded and idle state or the scanning state, if any key on the keyboard is pressed, the tablet computer may directly configure the levels of the output pins, with no need to switch the use status of the keyboard. In this way, an unnecessary loss of power can be reduced, and work efficiency of key scanning can be improved.

S705: The tablet computer scans the keys on the keyboard, to determine a target key.

In some embodiments, a process of scanning the keys on the keyboard to determine the target key may include the key scanning procedure shown in FIG. 3.

Specifically, after configuring the levels of all the output pins corresponding to the keys on the keyboard to the third level, the tablet computer may retain a level corresponding to a target output pin, and configure the levels of the output pins except the target output pin to the first level. The target output pin is any one of all the output pins in the keyboard. For example, as shown in FIG. 2, a target output pin may be any one of P33, P34, P35, and P36. In this implementation, the target output pin may be an output pin located in a first position in the keyboard. For example, the target output pin is P33 shown in FIG. 2. In another implementation, the target output pin may alternatively be an output pin located in a last position in the keyboard. For example, as shown in FIG. 2, the target output pin is P36.

Then, the tablet computer may obtain level statuses of all the input pins.

In some embodiments, the tablet computer may simultaneously obtain level statuses of all input pins corresponding to keys in rows in a column in which the target output pin is located, for example, obtain the level statuses of all the input pins in the keyboard. After obtaining the level statuses, the tablet computer determines, based on the level status of each of all the input pins, whether any of the keys corresponding to the target output pin (for example, the keys in the column in which the target output pin is located) is pressed, for example, determines whether there is the target key among the keys corresponding to the target output pin.

For example, the 4×4 matrix keyboard in FIG. 2 is used as an example. The target output pin is P33. The tablet computer may obtain level statuses of the input pin P17, the input pin P16, the input pin P15, and the input pin P14. Then, if the input pin P17 is at the third level, the tablet computer may determine the key "1" that corresponds to the input pin P17 and the target output pin P33, as the target key. If the level statuses of the input pin P17, the input pin P16, the input pin P15, and the input pin P14 are all the first level, the tablet computer may determine that there is no target key among the key "1", the key "5", the key "9", and the key "Stop" that correspond to the target output pin P33, for example, none of the key "1", the key "5", the key "9", and the key "Stop" is pressed by the user.

In some other embodiments, the tablet computer may obtain the level statuses of the input pins sequentially. Specifically, the tablet computer may obtain a level status of a first input pin. The first input pin is any one of all the input pins corresponding to the keys on the keyboard. For example, as shown in FIG. 2, a target input pin may be any one of P17, P16, P15, and P14. In this implementation, the first input pin may be an input pin located in a first position in the keyboard. For example, as shown in FIG. 3, the first input pin is P17. In another implementation, the first input pin may alternatively be an input pin located in a last position in the keyboard. For example, as shown in FIG. 2, the first input pin is P14.

Then, the tablet computer may determine, based on the level status of the first input pin, whether a key corresponding to the first input pin and the target output pin is the target key. If the key corresponding to the first input pin and the target output pin is not the target key, the tablet computer may obtain a level status of a second input pin. Then, the tablet computer takes the second input pin as a first input pin, and returns to perform the step that "the tablet computer may determine, based on the level status of the first input pin, whether a key corresponding to the first input pin and the target output pin is the target key", until the tablet computer determines that there is the target key, or until the tablet computer completes determination for the keys corresponding to the target output pin.

In an example, if the key corresponding to the first input pin and the target output pin is the target key, the tablet computer may determine the target key directly, with no need to perform a subsequent key scanning step. In this way, efficiency of determining the target key can be improved. In another example, if the key corresponding to the first input pin and the target output pin is the target key, the tablet computer may continue to obtain the level statuses of the input pins except the first input pin, until the tablet computer completes determination for the keys corresponding to the target output pin, and determines the target key. In this way, accuracy of determining the target key can be improved, and occurrence of a case in which a key is pressed but not scanned can be reduced.

For example, the 4×4 matrix keyboard in FIG. 2 is used as an example. The tablet computer may first obtain a level status of the input pin P17. If the input pin P17 is at the third level, the tablet computer may determine the key "1" that corresponds to the input pin P17 and the target output pin P33, as the target key. If the input pin P17 is at the first level, the tablet computer may continue to obtain a level status of the input pin P16, until the tablet computer determines that there is the target key on the keyboard, or until the tablet computer completes determination for the keys corresponding to the target output pin.

In some embodiments, if there is the target key among the keys corresponding to the target output pin, the tablet computer may determine a key that corresponds to an input pin with a level of the third level and the target output pin, as the target key. For example, as shown in FIG. 2, it can be learned from the foregoing descriptions that the target output pin is P33. If the input pin whose level status is the third level is P16, the tablet computer may determine the key "5" as the target key.

In some other embodiments, if there is no target key among the keys corresponding to the target output pin, the tablet computer may configure a level of a first output pin to the third level, and configure the levels of the output pins except the first output pin to the first level. The first output pin is any output pin that is of all the output pins corresponding to the keys on the keyboard and that is not determined as the target output pin. For example, as shown in FIG. 2, it can be learned from the foregoing descriptions that the target output pin is P33. In this case, the first output pin may be any output pin of P34, P35, and P36.

Then, the tablet computer may take the first output pin as a target output pin, and return to the step that "the tablet computer determines, based on level information of all the input pins, whether there is the target key among the keys corresponding to the target output pin", to continue to determine, based on the level information of the input pins, whether there is the target key among the keys corresponding to the target output pin, until the tablet computer scans all the output pins corresponding to the keys on the keyboard, or until the tablet computer determines that there is the target key on the keyboard and obtains the target key.

S706: The tablet computer determines whether a key on the keyboard is pressed.

Specifically, after determining the target key, the tablet computer may continue to determine whether a key on the keyboard is pressed, for example, whether the user presses a key on the keyboard again. If a key on the keyboard is pressed, it indicates that the tablet computer again receives the user's operation of pressing a key on the keyboard, for example, a current use status of the keyboard is still the scanning state. Therefore, the tablet computer may return to step S705, to continue to scan the keys on the keyboard. If none of the keys on the keyboard is pressed, it indicates that the tablet computer does not receive the user's operation of pressing any key on the keyboard. Therefore, the tablet computer may stop scanning the keys on the keyboard.

In some embodiments, after the tablet computer determines the target key, if the tablet computer does not receive, within a specific period of time (for example, the preset time), an interrupt signal sent by the keyboard, the tablet computer may determine that the user no longer uses the keyboard. Therefore, the tablet computer may stop scanning the keys on the keyboard, to reduce an unnecessary loss of power caused by key scanning.

S707: The tablet computer stops scanning, and switches the use status of the keyboard from the scanning state to the unfolded and idle state.

S708: The tablet computer separately configures the level statuses of all the output pins to the second level.

Specifically, after determining that no key on the keyboard is pressed, the tablet computer may stop scanning the keys on the keyboard, and switch the use status of the keyboard from the scanning state to the unfolded and idle state. Then, the tablet computer may return to step S703, to wait for the user's next pressing operation.

Figure 14:
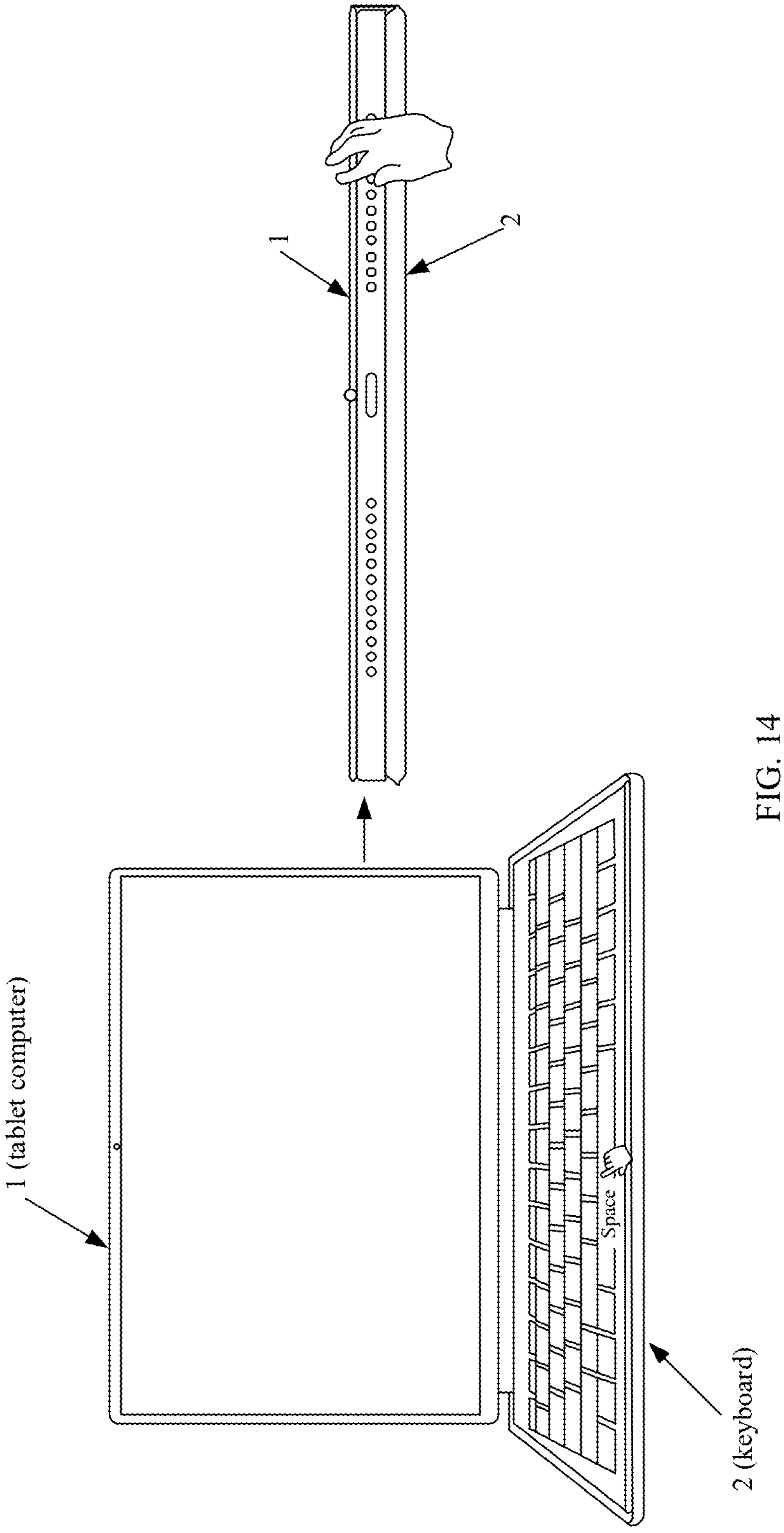
FIG. 14 is a diagram of a scene in which a keyboard is switched from a scanning state to an off state according to an embodiment of this disclosure.

In some embodiments, after it is determined that no key on the keyboard is pressed, the use status of the keyboard may be alternatively switched from the scanning state to the off state. The user performs a related operation on the tablet computer or the keyboard, making an angle θ between the back of the keyboard and the back of the display be an acute angle or a right angle, or an angle between the front of the keyboard and the side on which the display is located be zero, or an angle between the back of the keyboard and the back of the display be zero. In response to the operation, the tablet computer switches the use status of the keyboard to the off state. For example, as shown in FIG. 14, after any key on a keyboard 2 (for example, a key "Space") is pressed, if a tablet computer receives a user's operation of pushing a display, with the operation making a side on which the display is located and a front of the keyboard be in contact with each other, the tablet computer may stop scanning keys on the keyboard, switch a use status of the keyboard from a scanning state to an off state, and separately set levels of all output pins to a level in the off state (for example, a first level).

In some embodiments, the use status of the keyboard may be alternatively switched from the unfolded and idle state to the off state. A process of switching from the unfolded and idle state to the off state is similar to the process of switching from the scanning state to the off state, except that the tablet computer in the unfolded and idle state does not need to perform scanning. The user performs a related operation on the tablet computer or the keyboard, making an angle θ between the back of the keyboard and the back of the display be an acute angle or a right angle, or an angle between the front of the keyboard and the side on which the display is located be zero, or an angle between the back of the keyboard and the back of the display be zero. In response to the operation, the tablet computer switches the use status of the keyboard that is in the unfolded and idle state to the off state.

In some embodiments, when the on state does not include the unfolded and idle state or the scanning state, if no key on the keyboard is pressed, the tablet computer may directly return to step S703, to wait for the user's next pressing operation, with no need to switch the use status of the keyboard. In this way, an unnecessary loss of power can be reduced, and work efficiency of key scanning can be improved.

Figure 15A:
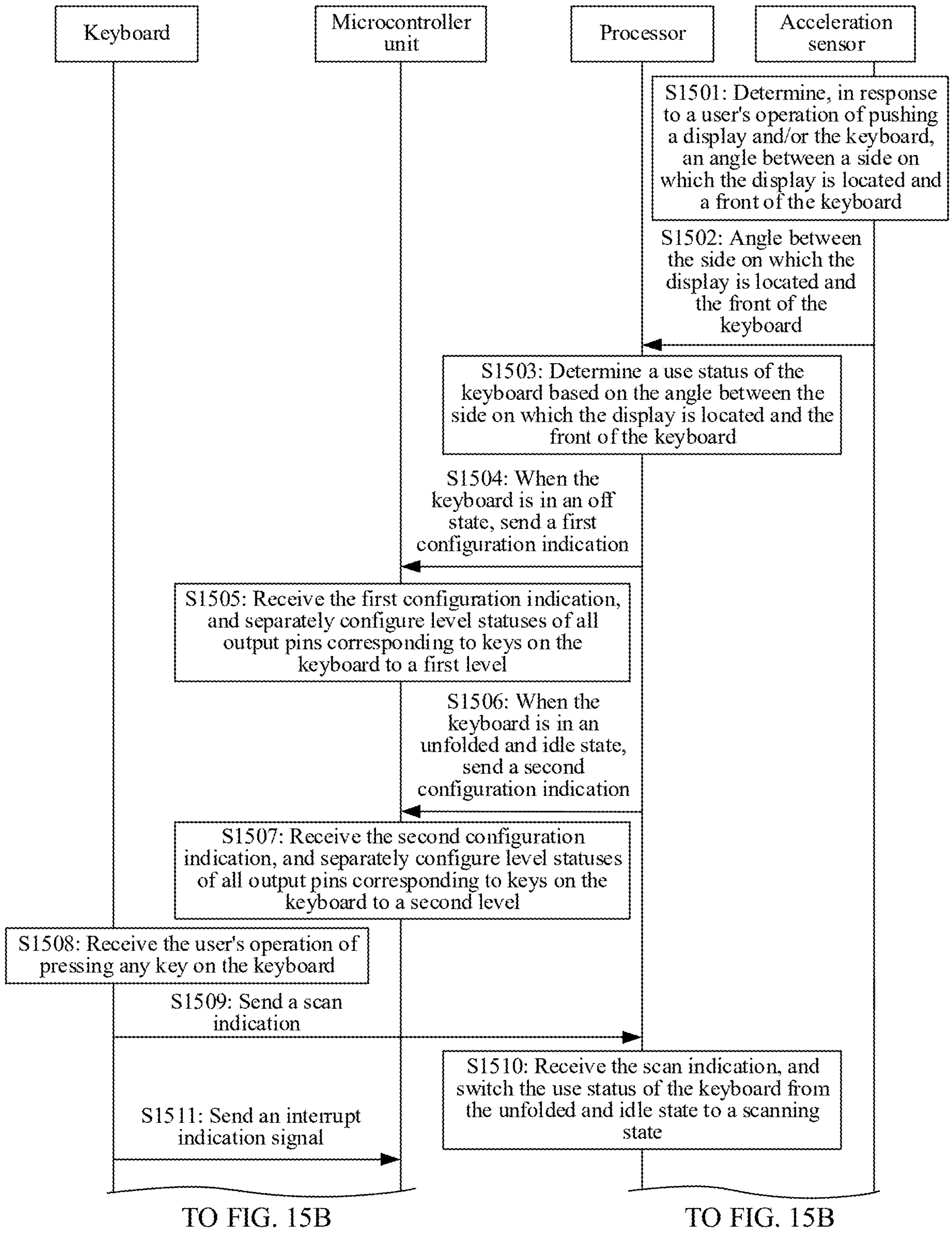
FIG. 15A and FIG. 15B are schematic flowcharts of a key scanning method according to an embodiment of this disclosure.
Figure 15B:
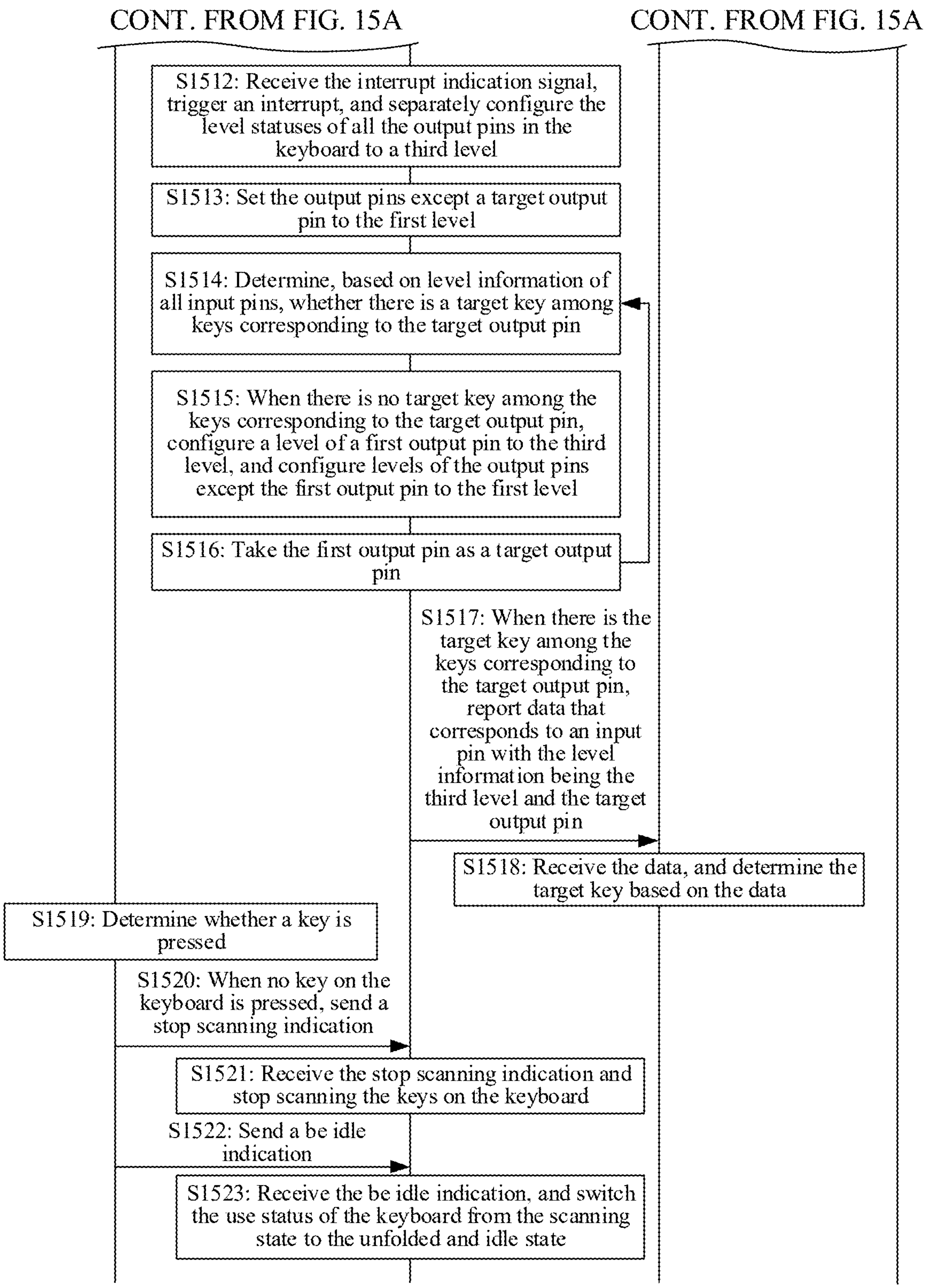

With reference to the structure shown in FIG. 5 and a key scanning procedure shown in FIG. 15A and FIG. 15B, the following describes in detail a process of how a tablet computer scans keys.

S1501: In response to a user's operation of pushing a display and/or a keyboard, an acceleration sensor in a tablet computer determines an angle between a side on which the display is located and a front of the keyboard.

The operation of pushing the display and/or the keyboard is an operation that fingers of the user touch the display and/or the keyboard and push the display and/or the keyboard. In an example, the pushing operation may be a first operation. The first operation is capable of triggering switching of a use status of the keyboard from a scanning state to an off state. Specifically, the pushing operation may be an operation of making the display and the keyboard be in contact with each other, for example, the operation, shown in FIG. 14, of closing the tablet computer that the user performs after pressing a key on the keyboard. In an example, the pushing operation may be a second operation. The second operation is capable of triggering switching of a use status of the keyboard from an unfolded and idle state to an off state. Specifically, the pushing operation may be an operation of making the display and the keyboard be in contact with each other, for example, an operation of closing the tablet computer that the user performs after not performing key pressing. In another example, the pushing operation may be a third operation. The third operation is capable of triggering switching of a use status of the keyboard from an off state to an unfolded and idle state. Specifically, the pushing operation may be an operation of separating the display from the keyboard, for example, the operation, shown in FIG. 12, of opening the tablet computer by the user.

In some embodiments, the acceleration sensor is configured to detect an acceleration and gravity sensing of the tablet computer during movement. Specifically, the acceleration and gravity sensing may be detected by using three axes (an X-axis, a Y-axis, and a Z-axis). For example, the acceleration sensor can detect a tilt direction of the tablet computer. In this case, based on the tilt direction, the angle between the side on which the display is located and the front of the keyboard is calculated.

S1502: A processor in the tablet computer receives the angle between the side on which the display is located and the front of the keyboard sent by the acceleration sensor.

Specifically, after determining the angle between the side on which the display is located and the front of the keyboard, the acceleration sensor may send the angle to the processor in the tablet computer, to facilitate subsequent determination of the use status of the keyboard.

S1503: The processor determines the use status of the keyboard based on the angle between the side on which the display is located and the front of the keyboard.

In some embodiments, if the angle between the side on which the display is located and the front of the keyboard is a reflex angle, a complete angle, or a zero angle, the processor may determine that the use status of the keyboard is the off state. A reflex angle is an angle that is greater than 180 degrees but less than 360 degrees. A complete angle is an angle of 360 degrees. A zero angle is an angle of 0 degrees.

In some other embodiments, if the angle between a front of a body of the tablet computer (for example, the side on which the display is located) and the front of the keyboard is an inferior angle, the processor may determine that the use status of the keyboard is an on state. An inferior angle is an angle that is greater than 0 degrees but less than 180 degrees. The inferior angle may include an acute angle, a right angle, and an obtuse angle. An acute angle is an angle that is greater than 0 degrees but less than 90 degrees. A right angle is an angle of 90 degrees. An obtuse angle is an angle that is greater than 90 degrees but less than 180 degrees.

S1504: When the keyboard is in the off state, the processor sends a first configuration indication to a microcontroller unit.

S1505: The microcontroller unit receives the first configuration indication, and separately configures level statuses of all output pins corresponding to keys on the keyboard to a first level.

S1506: When the keyboard is in the unfolded and idle state, the processor sends a second configuration indication to a microcontroller unit.

S1507: The microcontroller unit receives the second configuration indication, and separately configures level statuses of all output pins corresponding to keys on the keyboard to a second level.

S1508: The keyboard receives the user's operation of pressing any key on the keyboard.

S1509: The keyboard sends a scan indication to the processor.

S1510: The processor receives the scan indication, and switches the use status of the keyboard from the unfolded and idle state to the scanning state.

S1511: The keyboard sends an interrupt signal to the microcontroller unit.

In some embodiments, S1509 and S1511 may be performed simultaneously. In other words, after receiving the user's operation of pressing any key, the keyboard may simultaneously send the scan indication to the processor and send an interrupt indication to the microcontroller unit. In this way, work efficiency can be improved, and time costs can be reduced.

In some other embodiments, S1509 and S1511 may be alternatively performed sequentially. In other words, after receiving the user's operation of pressing any key, the keyboard may first send the scan indication to the processor and then send an interrupt indication to the microcontroller unit, or may first send an interrupt indication to the microcontroller unit and then send the scan indication to the processor. This is not specifically limited.

S1512: The microcontroller unit receives the interrupt signal, triggers an interrupt, and separately configures the level statuses of all the output pins in the keyboard to a third level.

In some embodiments, after the keyboard receives the user's operation of pressing any key on the keyboard, there may be the following two manners: The keyboard sends the scan indication directly to the processor; and the keyboard first sends the interrupt signal to the microcontroller unit, and after receiving the interrupt signal, the microcontroller unit triggers an interrupt and sends a scan indication to the processor. In other words, the scan indication may be sent by the keyboard or by the microcontroller unit. This is not specifically limited.

S1513: The microcontroller unit sets the output pins except a target output pin to the first level.

S1514: The microcontroller unit determines, based on levels of all input pins, whether there is a target key among keys corresponding to the target output pin.

For example, if the levels of all the input pins are all the first level, it indicates that there is no target key among the keys corresponding to the target output pin; or if a level of any of all the input pins is the third level, it indicates that there is the target key among the keys corresponding to the target output pin.

S1515: When there is no target key among the keys corresponding to the target output pin, the microcontroller unit configures a level of a first output pin to the third level, and configures the levels of the output pins except the first output pin to the first level.

The first output pin is any output pin that is of all the output pins corresponding to the keys on the keyboard and that is not determined as the target output pin.

In some embodiments, after determining that there is no target key among the keys corresponding to the target output pin, the microcontroller unit may configure the level of the first output pin to the third level, and configure the levels of the output pins except the first output pin to the first level, to continue to determine whether there is the target key among keys corresponding to the first output pin.

S1516: The microcontroller unit takes the first output pin as a target output pin, and returns to step S1514.

Specifically, after setting the level statuses of the output pins, the microcontroller unit may take the first output pin as a new target output pin, and return to step S1514, to continue to determine, based on the levels of the input pins, whether there is the target key among keys corresponding to the new target output pin.

S1517: When there is the target key among the keys corresponding to the target output pin, the microcontroller unit reports data that corresponds to an input pin with a level of the third level and the target output pin, to the processor.

S1518: The processor receives the data, and determines the target key based on the data.

Specifically, after receiving the data, the processor may compare the data with target data corresponding to each key on the keyboard, to determine the target key. It may be understood that each key on the keyboard corresponds to a piece of target data, and the target data may be preset and indicate that the key is pressed. For example, the key "1" in FIG. 2 is used as an example. If data 01 indicates that the key "1" is pressed, and data reported to the processor is 01, the processor can determine that the key "1" on the keyboard is pressed by the user.

S1519: After the target key is determined, the keyboard determines whether a key is pressed.

Specifically, after the target key is determined, the keyboard may continue to determine whether a key is pressed, for example, whether the user presses a key on the keyboard again. If a key on the keyboard is pressed, the keyboard may return to step S1511, to continue to scan the keys on the keyboard. If none of the keys on the keyboard is pressed, it indicates that the user may not use the keyboard temporarily. In this case, the microcontroller unit may stop scanning the keys on the keyboard, for example, the keyboard may send a stop scanning indication to the microcontroller unit.

S1520: When no key on the keyboard is pressed, the keyboard may send the stop scanning indication to the microcontroller unit.

In some embodiments, after determining that none of the keys on the keyboard is pressed, the keyboard may send the stop scanning indication to the microcontroller unit, so that the microcontroller unit stops scanning the keys on the keyboard.

S1521: The microcontroller unit receives the stop scanning indication and stops scanning the keys on the keyboard.

S1522: The keyboard sends a be idle indication to the processor.

Specifically, after the keyboard determines that none of the keys on the keyboard is pressed, there may be the following two manners: The keyboard sends the be idle indication directly to the processor; and the keyboard first sends the stop scanning indication to the microcontroller unit, and after receiving the stop scanning indication, the microcontroller unit stops scanning the keys on the keyboard and sends a be idle indication to the processor. In other words, the be idle indication may be sent by the keyboard or by the microcontroller unit. This is not specifically limited.

In some embodiments, S1520 and S1522 may be performed simultaneously. In other words, after determining that none of the keys is pressed, the keyboard may simultaneously send the be idle indication to the processor and send the stop scanning indication to the microcontroller unit. In this way, work efficiency can be improved, and time costs can be reduced.

In some other embodiments, S1520 and S1522 may be alternatively performed sequentially. In other words, after determining that none of the keys is pressed, the keyboard may first send the be idle indication to the processor and then send the stop scanning indication to the microcontroller unit, or may first send the stop scanning indication to the microcontroller unit and then send the be idle indication to the processor. This is not specifically limited.

S1523: The processor receives the be idle indication, and switches the use status of the keyboard from the scanning state to the unfolded and idle state.

It should be noted that S1504 and S1505, and S1506 to S1523 are parallel solutions. In other words, if the keyboard is in the off state, S1504 and S1505 are performed; and if the keyboard is in the on state, S1506 to S1523 are performed.

It should be understood that corresponding steps performed by modules in the mobile phone may be alternatively performed by other modules in the tablet computer. For example, the procedure that the keyboard sends the scan indication to the processor may be alternatively performed by the microcontroller unit. For another example, the procedure that the keyboard sends the be idle indication to the processor may be alternatively performed by the microcontroller unit. This is not specifically limited.

An embodiment of this disclosure further provides a computer-readable storage medium. The computer storage medium includes computer instructions. When the computer instructions are run on an electronic device, the electronic device is enabled to perform the functions or steps in the foregoing method embodiment.

An embodiment of this disclosure further provides a computer program product, including a computer program. When the computer program is run on an electronic device, the electronic device is enabled to perform the functions or steps in the foregoing method embodiment.

An embodiment of this disclosure provides a chip. The chip is configured to execute instructions. When being run, the chip performs the technical solutions in the foregoing embodiments. Implementation principles and technical effects thereof are similar, and details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from one computer-readable storage medium to another. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium that can be accessed by a computer, or may be a data storage device, such as a server or a data center, integrating one or more available media. The available medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

It should be understood that an "embodiment" mentioned throughout the specification means that particular characteristics, structures, or features related to the embodiment are included in at least one embodiment of this disclosure. Therefore, the embodiments throughout the specification do not necessarily indicate a same embodiment. In addition, these particular characteristics, structures, or features may be combined in one or more embodiments in any appropriate manner. It should be understood that the sequence numbers of the foregoing procedures do not mean execution orders in various embodiments of this disclosure. Execution orders of the procedures should be determined based on functions and internal logic of the procedures, and shall not constitute any limitation on implementation processes in embodiments of this disclosure.

It should also be understood that in this disclosure, "when" and "if" both mean that a UE or a base station performs corresponding processing in a specific objective circumstance, neither limiting time, nor requiring that the UE or base station needs to perform determination during implementation, nor implying that there is another limitation.

A person of ordinary skill in the art may understand that "first", "second", and various numbers in this disclosure are merely used for differentiation for ease of description, are not used to limit the scope of embodiments of this disclosure, and also indicate a sequence.

In this disclosure, an element expressed in a singular form is intended to mean "one or more", rather than "one and only one", unless otherwise specified. In this disclosure, unless otherwise specified, "at least one" is intended to mean "one or more", while "a plurality of" is intended to mean "two or more".

The term "and/or" in this specification is merely an association describing associated objects, indicating that three relationships may exist. For example, A and/or B may indicate the following three cases: Only A exists, both A and B exist, and only B exists, where A and B may be singular or plural.

The term "at least one of" in this specification indicates all or any combination of items listed. For example, "at least one of A, B, and C" may indicate the following six cases: Only A exists, only B exists, only C exists, both A and B exist, both B and C exist, and A, B, and C all exist, where A, B, and C may be singular or plural.

A person of ordinary skill in the art may be aware that the units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It can be clearly understood by a person skilled in the art that for a purpose of convenient and brief description, for specific work processes of the systems, apparatuses, and units described above, reference may be made to corresponding processes in the foregoing method embodiments. Details are not described herein again.

In the several embodiments provided in this disclosure, it should be understood that the disclosed system, apparatus, and method may be implemented in other manners. For example, the apparatus embodiments described above are merely examples. For example, division into the units is merely division into logical functions, and may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, for example, may be located in a location, or may be distributed on a plurality of network units. Some or all of the units may be selected based on actual requirements to achieve the objectives of the solutions in embodiments.

In addition, functional units in embodiments of this disclosure may be integrated in one processing unit, each of the units may stand alone physically, or two or more units may be integrated in one unit.

When the functions are implemented in a form of a software functional unit and sold or used as an independent product, the functions may be stored in a computer-readable storage medium. Based on such an understanding, the technical solutions in this disclosure essentially, or the part contributing to the conventional technology, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in embodiments of this disclosure. The storage medium includes any medium that can store program code, such as a USB flash drive, a removable hard disk, a read-only memory (ROM), a random access memory (RAM), a magnetic disk, or a compact disc.

For parts that are the same or similar in embodiments in this disclosure, reference may be made to each other. In this disclosure, in the embodiments and in the implementations/implementation methods in the embodiments, if there are no special descriptions or there is no logical conflict, terms and/or descriptions in different embodiments and in the implementations/implementation methods in the embodiments are consistent and may be referenced to each other. Technical features in different embodiments and in the implementations/implementation methods in the embodiments may be combined to form a new embodiment, implementation, or implementation method based on an intrinsic logical relationship between the technical features. The foregoing implementations of this disclosure do not constitute a limitation on the protection scope of this disclosure.

The foregoing descriptions are merely specific implementations of this disclosure, but the protection scope of this disclosure is not limited thereto. Any variation or replacement readily figured out by a person skilled in the art within the technical scope disclosed in this disclosure shall fall within the protection scope of this disclosure. Therefore, the protection scope of this disclosure should be subject to the protection scope of the claims. In conclusion, the foregoing descriptions are merely example embodiments of the technical solutions in this disclosure and are not intended to limit the protection scope of this disclosure. Any modification, equivalent replacement, improvement, and the like made within the spirit and principles of this disclosure shall fall within the protection scope of this disclosure.

What is claimed is:

1. A level setting method applied to an electronic device coupled to a keyboard comprising a plurality of keys, wherein the method comprises:

configuring, by the electronic device responsive to the keyboard being in an off state, levels of all output pins corresponding to the keys on the keyboard to a first level, wherein the off state corresponds to the keyboard not being used as an input device; and configuring, by the electronic device responsive to the keyboard being in an on state, levels of all output pins corresponding to the keys on the keyboard to a target level, wherein the target level comprises a second level or a third level, wherein the target level is higher than the first level, wherein the second level is less than the third level, wherein the second level and the third level are both for the keyboard to generate an interrupt in response to an operation of triggering a key on the keyboard, and wherein levels of all input pins corresponding to the keys on the keyboard are the first level, wherein the on state comprises an unfolded and idle state and a scanning state, wherein the unfolded and idle state corresponds to the keyboard being capable of being used as an input device but not receiving an operation of triggering a key on the keyboard, wherein the scanning state corresponds to the keyboard being used as an input device, and wherein configuring the levels of all the output pins corresponding to the keys on the keyboard to the target level comprises:

configuring, by the electronic device responsive to the keyboard being in the unfolded and idle state, the levels of all the output pins to the second level; and configuring, by the electronic device responsive to the keyboard being in the scanning state, the levels of all the output pins to the third level.

2. The method of claim 1, wherein the on state comprises an unfolded and idle state and a scanning state, and wherein the method further comprises:

receiving, by the electronic device when the keyboard is in the unfolded and idle state, an operation of triggering a key on the keyboard;

configuring, by the electronic device in response to the trigger operation, the levels of all the output pins corresponding to the keys on the keyboard to the third level, wherein the third level corresponds to the scanning state; and scanning, by the electronic device, the keys on the keyboard, to determine a target key.

3. The method of claim 2, wherein after determining the target key, the method further comprises:

stopping scanning, by the electronic device, when the operation of triggering the key on the keyboard is not received; and configuring the levels of all the output pins to the second level, wherein the second level corresponds to the unfolded and idle state.

4. The method of claim 1, wherein while the keyboard is in the scanning state, the method further comprises configuring, by the electronic device in response to a first operation performed on the keyboard, the levels of all the output pins to the first level, wherein the first level corresponds to the off state, and wherein the first operation is capable of triggering switching of a use status of the keyboard from the scanning state to the off state.

5. The method of claim 1, wherein while the keyboard is in the unfolded and idle state, the method further comprises configuring, by the electronic device in response to a second operation performed on the keyboard, the levels of all the output pins to the first level, wherein the first level corresponds to the off state, and wherein the second operation is capable of triggering switching of a use status of the keyboard from the unfolded and idle state to the off state.

6. The method of claim 1, wherein while the keyboard is in the off state, the method further comprises configuring, by the electronic device in response to a third operation performed on the keyboard, the levels of all the output pins to the second level, wherein the second level corresponds to an unfolded and idle state of the keyboard, and wherein the third operation is capable of triggering switching of a use status of the keyboard from the off state to the unfolded and idle state.

7. The method of claim 1, wherein the first level is 0 volts (V), wherein the second level is 1.8 V, and wherein the third level is 3.3 V.

8. An electronic device, comprising:

a keyboard configured to receive an operation of triggering a key on the keyboard;

a display;

one or more memories configured to store computer code comprising computer instructions; and one or more processors coupled to the keyboard, the display, and the one or more memories, wherein the display is configured to display an image generated by the processor, and wherein the one or more processors are configured to execute the instructions to configure the electronic device to perform operations comprising:

configuring, by the electronic device responsive to the keyboard being in an off state, levels of all output pins corresponding to the keys on the keyboard to a first level, wherein the off state corresponds to the keyboard not being used as an input device; and configuring, by the electronic device responsive to the keyboard being in an on state, levels of all output pins corresponding to the keys on the keyboard to a target level, wherein the target level comprises a second level or a third level, wherein the target level is higher than the first level, wherein the second level is less than the third level, wherein the second level and the third level are both for the keyboard to generate an interrupt in response to an operation of triggering a key on the keyboard, and wherein levels of all input pins corresponding to the keys on the keyboard are the first level, wherein the on state comprises an unfolded and idle state and a scanning state, wherein the unfolded and idle state corresponds to the keyboard being capable of being used as an input device but not receiving an operation of triggering a key on the keyboard, wherein the scanning state corresponds to the keyboard being used as an input device, and wherein configuring the levels of all the output pins corresponding to the keys on the keyboard to the target level comprises:

configuring, by the electronic device responsive to the keyboard being in the unfolded and idle state, the levels of all the output pins to the second level; and configuring, by the electronic device responsive to the keyboard being in the scanning state, the levels of all the output pins to the third level.

9. The electronic device of claim 8, wherein the on state comprises an unfolded and idle state and a scanning state, and wherein the one or more processors are configured to execute the instructions to configure the electronic device to perform operations comprising:

receiving, by the electronic device when the keyboard is in the unfolded and idle state, an operation of triggering a key on the keyboard;

configuring, by the electronic device in response to the trigger operation, the levels of all the output pins corresponding to the keys on the keyboard to the third level, wherein the third level corresponds to the scanning state; and scanning, by the electronic device, the keys on the keyboard, to determine a target key.

10. The electronic device of claim 9, wherein after determining the target key, the one or more processors are configured to execute the instructions to configure the electronic device to perform operations comprising:

stopping scanning, by the electronic device when the operation of triggering the key on the keyboard is not received; and configuring the levels of all the output pins to the second level, wherein the second level corresponds to the unfolded and idle state.

11. The electronic device of claim 8, wherein while the keyboard is in the scanning state, the one or more processors are configured to execute the instructions to configure the electronic device to perform operations comprising configuring, by the electronic device in response to a first operation performed on the keyboard, the levels of all the output pins to the first level, wherein the first level corresponds to the off state, and wherein the first operation is capable of triggering switching of a use status of the keyboard from the scanning state to the off state.

12. The electronic device of claim 8, wherein while the keyboard is in the unfolded and idle state, the one or more processors are configured to execute the instructions to configure the electronic device to perform operations comprising configuring, by the electronic device in response to a second operation performed on the keyboard, the levels of all the output pins to the first level, wherein the first level corresponds to the off state, and wherein the second operation is capable of triggering switching of a use status of the keyboard from the unfolded and idle state to the off state.

13. The electronic device of claim 8, wherein while the keyboard is in the off state, the one or more processors are configured to execute the instructions to configure the electronic device to perform operations comprising configuring, by the electronic device in response to a third operation performed on the keyboard, the levels of all the output pins to the second level, wherein the second level corresponds to an unfolded and idle state of the keyboard, and wherein the third operation is capable of triggering switching of a use status of the keyboard from the off state to the unfolded and idle state.

14. The electronic device of claim 8, wherein the first level is 0 volts (V), wherein the second level is 1.8 V, and wherein the third level is 3.3 V.

15. A non-transitory computer-readable storage medium comprising computer instructions, which when executed by an electronic device coupled to a keyboard comprising a plurality of keys, configures the electronic device to perform operations comprising:

configuring, by the electronic device responsive to the keyboard being in an off state, levels of all output pins corresponding to the keys on the keyboard to a first level, wherein the off state corresponds to the keyboard not being used as an input device; and configuring, by the electronic device responsive to the keyboard being in an on state, levels of all output pins corresponding to the keys on the keyboard to a target level, wherein the target level comprises a second level or a third level, wherein the target level is higher than the first level, wherein the second level is less than the third level, wherein the second level and the third level are both for the keyboard to generate an interrupt in response to an operation of triggering a key on the keyboard, and wherein levels of all input pins corresponding to the keys on the keyboard are the first level, wherein the on state comprises an unfolded and idle state and a scanning state, wherein the unfolded and idle state corresponds to the keyboard being capable of being used as an input device but not receiving an operation of triggering a key on the keyboard, wherein the scanning state corresponds to the keyboard being used as an input device, and wherein configuring the levels of all the output pins corresponding to the keys on the keyboard to the target level comprises:

configuring, by the electronic device responsive to the keyboard being in the unfolded and idle state, the levels of all the output pins to the second level; and configuring, by the electronic device responsive to the keyboard being in the scanning state, the levels of all the output pins to the third level.

16. The non-transitory computer-readable storage medium of claim 15, wherein the on state comprises an unfolded and idle state and a scanning state, and wherein executing the instructions configures the electronic device to perform operations comprising:

receiving, by the electronic device when the keyboard is in the unfolded and idle state, an operation of triggering a key on the keyboard;

configuring, by the electronic device in response to the trigger operation, the levels of all the output pins corresponding to the keys on the keyboard to the third level, wherein the third level corresponds to the scanning state; and scanning, by the electronic device, the keys on the keyboard, to determine a target key.

17. The non-transitory computer-readable storage medium of claim 16, wherein after determining the target key, executing the instructions configures the electronic device to perform operations comprising:

stopping scanning, by the electronic device when the operation of triggering the key on the keyboard is not received; and configuring the levels of all the output pins to the second level, wherein the second level corresponds to the unfolded and idle state.

* * * * *